United States Patent
Bruno et al.

(10) Patent No.: US 8,739,635 B2
(45) Date of Patent: Jun. 3, 2014

(54) SYSTEM, METHOD AND APPARATUS FOR MEASURING MULTIPHASE FLOW

(75) Inventors: Pinguet Bruno, Lormes (FR); Onerazan Bornia, Bergen (NO); Gilles Roux, Sainte Genevieve des Bois (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 234 days.

(21) Appl. No.: 13/321,171

(22) PCT Filed: May 18, 2010

(86) PCT No.: PCT/EP2010/003052
§ 371 (c)(1),
(2), (4) Date: Jan. 18, 2012

(87) PCT Pub. No.: WO2010/133348
PCT Pub. Date: Nov. 25, 2010

(65) Prior Publication Data
US 2012/0216625 A1    Aug. 30, 2012

Related U.S. Application Data

(60) Provisional application No. 61/179,832, filed on May 20, 2009.

(51) Int. Cl.
*G01F 1/74* (2006.01)

(52) U.S. Cl.
USPC ....................................................... 73/861.04

(58) Field of Classification Search
USPC ............................................... 73/861.04
See application file for complete search history.

(56) References Cited

U.S. PATENT DOCUMENTS

| | | | |
|---|---|---|---|
| 5,158,751 A * | 10/1992 | del Valle et al. | 422/82 |
| 5,540,077 A * | 7/1996 | Benning et al. | 73/1.05 |
| 6,234,030 B1 * | 5/2001 | Butler | 73/861.04 |
| 6,382,032 B1 * | 5/2002 | Hatton et al. | 73/861.04 |
| 8,472,582 B2 | 6/2013 | Roux et al. | |
| 2005/0188771 A1 | 9/2005 | Bo et al. | |
| 2007/0287190 A1 | 12/2007 | Chevalier et al. | |
| 2008/0087107 A1 * | 4/2008 | Silvis et al. | 73/863.02 |
| 2008/0319685 A1 | 12/2008 | Xie et al. | |
| 2009/0234593 A1 * | 9/2009 | Atkinson et al. | 702/45 |
| 2010/0140496 A1 * | 6/2010 | Pinguet et al. | 250/432 R |
| 2011/0283809 A1 * | 11/2011 | Pihlaja et al. | 73/861.04 |

FOREIGN PATENT DOCUMENTS

| | | |
|---|---|---|
| EP | 1862781 | 12/2007 |
| EP | 1970702 | 9/2008 |
| WO | 97/42493 | 11/1997 |
| WO | 2005116637 | 12/2005 |
| WO | 2009/005876 | 1/2009 |

\* cited by examiner

Primary Examiner — Jewel V Thompson
(74) Attorney, Agent, or Firm — Cameron R. Sneddon

(57) ABSTRACT

A system, method and apparatus for measuring fluid properties of a fluid flow having four phases, including a fractional measurement device configured to determine respective fractional measurements of each of four phases of fluids flowing in a fluid flow; and a behavioral modeling device configured to determine, based on the respective fractional measurements of each of the four phases of fluids, respective flow rates for each of the four phases of fluids.

18 Claims, 15 Drawing Sheets

SYSTEM, METHOD AND APPARATUS FOR MEASURING MULTIPHASE FLOW

CROSS REFERENCE TO RELATED APPLICATIONS

The present invention claims benefit of priority to U.S. Provisional Patent Application Ser. No. 61/179,832 of Bruno PINGUET et al., entitled "SYSTEM, METHOD AND APPARATUS FOR MEASURING MULTIPHASE FLOW," filed on May 20, 2009, the entire disclosure of which is hereby incorporated by reference.

TECHNICAL FIELD

This present disclosure relates generally to the field of fluid property measurements, and relates more particularly, but not by way of limitation, to metering of multiphase fluid flow comprising four phases.

BACKGROUND ART

As is well known, the growing consumption of hydrocarbons around the world leads oil companies to look for new fields of development. Hydrocarbon reservoirs are becoming less easy to produce provided that many are usually either offshore, subsea, or in areas where human presence is limited or impossible. Added to the challenge of difficult production, there is an extra expense with produced fluids of less quality, which require proper optimization of the development and production costs.

Overall, the trend of new discoveries is based either on gas production (e.g., high API) or on production of viscous fluid, usually called Heavy Oil, Extra-Heavy Oil, and Bitumen. These fluids can be so viscous that most of the time they cannot flow naturally due to the friction they create against the pipe wall, wherein it is necessary to add diluent or a chemical additive to the fluids so as to lower the viscosity and so as to provide the resulting flow to gathering centers for specific reconditioning and treatment.

Accordingly, there is a need for systems and methods that address the above and other problems with background art systems and methods for processing gas and highly viscous fluids.

SUMMARY OF THE DISCLOSURE

In view of the foregoing disadvantages inherent in the background art systems and methods, exemplary embodiments of the present disclosure are directed to a solution for production and monitoring, as related to four phase flow. The exemplary systems and methods thus provide a new and useful four phase, multiphase flowmeter, which avoids many of the defects and disadvantages of the background art systems and methods, and include many novel features, which are not anticipated, rendered obvious, suggested, or even implied by any of the background art systems and methods, either alone or in any combination thereof.

According to an aspect of the present disclosure, one or more exemplary embodiments relate to systems and methods for monitoring the production of oil, water, gas, and diluent.

The exemplary systems and methods can monitor in real-time, and can do so without additional sensors in the system. The systems methods can be based on novel technology for nuclear measurements, and can be based on solving fundamental problems in the background art and the use of the properties of the nuclear measurement by combining at least three gamma/X-Ray energy levels to measure each phase of a four phase fluid flow. The systems and methods can utilize a dedicated fluid behavior model to estimate the real fluid properties at line conditions. The systems and methods can provide fractions and flow rates for each of the four phases in any suitable conditions, regardless of the range of concentration of the four phases flowing through a flowline.

According to another aspect of the present disclosure, one or more exemplary embodiments relate to systems and methods for monitoring the production of four phase fluid flow based on the use of certain nuclear fluid properties capable of allowing a discrimination of the four phases in a unique way, combined with the simultaneous use of fluid behavior properties, and which can provide in real-time the flow rate of each phase. The systems and methods can be provided in any suitable pipeline, from subsea to surface, and need not employ intervention after installation. Moreover, the systems and methods can be more compact than systems and methods employing a conventional process, such as use of a separator. In an exemplary embodiment, the systems and methods need not employ any moving parts and can be independent of the diluent injection rate. Furthermore, an aspect of the present disclosure, the systems and methods need not employ flow rate information a priori or employ well site flow calibration. The systems and methods can include a combination of novel nuclear measurements, fluid properties behavior analysis and the use of any suitable equipment working on the principle of differential pressure measurement, such as a venturi, an orifice, a valve, a choke, and the like.

Accordingly, in an exemplary aspect there is provided a system for measuring fluid properties of a fluid flow having four phases, the system including a fractional measurement device configured to determine respective fractional measurements of each of four phases of fluids flowing in a fluid flow; and a behavioral modeling device configured to determine, based on the respective fractional measurements of each of the four phases of fluids, respective flow rates for each of the four phases of fluids.

Accordingly, in a further exemplary aspect there is provided a method for measuring fluid properties of a fluid flow having four phases, the method including determining by a fractional measurement device respective fractional measurements of each of four phases of fluids flowing in a fluid flow; and determining by a behavioral modeling device, based on the respective fractional measurements of each of the four phases of fluids, respective flow rates for each of the four phases of fluids.

Accordingly, in a further exemplary aspect there is provided an apparatus for measuring fluid properties of a fluid flow having four phases, the apparatus including a fractional measurement device configured to determine respective fractional measurements of each of four phases of fluids flowing in a fluid flow; and a behavioral modeling device configured to determine, based on the respective fractional measurements of each of the four phases of fluids, respective flow rates for each of the four phases of fluids.

The four phases of fluids include a water phase, a gas phase, an oil phase, and a diluent phase.

The four phases of fluids impact an overall fluid behavior of the mix of the phases, and include a mix of a water phase, a gas phase, a crude phase, and a fourth phase, the fourth phase including a diluent phase or an oil phase having different properties than the crude phase.

The fractional measurement device is based on a nuclear measurement device.

The behavioral modeling device is based on a differential pressure measurement device, including at least one of a sensor, a venturi, an orifice, a valve, a choke, a bend, an elbow, and a restriction.

The nuclear measurement device includes a barium source, wherein the barium source includes a combination of more than 9 main energy peaks regrouped in at least 4 main peaks, including a first peak around 30 keV, a second peak around 80 keV, a third peak around 160 keV, and a fourth peak around 302 to 383 keV.

These together with other aspects, features, and advantages of the present disclosure, along with the various features of novelty, which characterize the invention, are pointed out with particularity in the claims annexed to and forming a part of this disclosure. The above aspects and advantages are neither exhaustive nor individually or jointly critical to the spirit or practice of the disclosure. Other aspects, features, and advantages of the present disclosure will become readily apparent to those skilled in the art from the following detailed description in combination with the accompanying drawings. Accordingly, the drawings and description are to be regarded as illustrative in nature, and not restrictive.

BRIEF DESCRIPTION OF THE DRAWINGS

To assist those of ordinary skill in the relevant art in making and using the subject matter hereof, reference is made to the appended drawings, in which like reference numerals may refer to similar elements for consistency.

DETAILED DESCRIPTION

Specific embodiments of the present disclosure will now be described in detail with reference to the accompanying drawings. Further, in the following detailed description of embodiments of the present disclosure, numerous specific details are set forth in order to provide a more thorough understanding of the invention. However, it will be apparent to one of ordinary skill in the art that the embodiments disclosed herein can be practiced without these specific details. In other instances, well-known features have not been described in detail to avoid unnecessarily complicating the description.

The terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited. In the context of the present disclosure, "diluent" can include any suitable secondary oil used to blend with the produced oil from the reservoir, and as such include any suitable fluid, such as oil used to blend with the reservoir oil, and can also include any suitable fluid used to prevent formation of solids and/or that look like ice (e.g., such as methanol as a diluent, and/or look like ice as a hydrate). In the context of the present disclosure, "oil" can include, black oil, or any suitable condensate, and the like.

The present disclosure includes recognition that diluent costs are high and a proper control and optimization of the injection rate can lead to significant cost reduction. In the meantime, regulatory bodies are looking for equipment capable of accurately measuring the different phases flowing in the main pipe to ensure that the royalties or taxes are applied correctly. This extends also to custody transfer among oil companies using a same pipeline to produce different fields and to be able to recognize accurately each of their own contributions. Finally, oil companies want to be able to optimize reservoir management. In this type of application, there are a minimum of four phases flowing in the main pipe, including Viscous Oil, Water, Gas, and Diluent, all of which can be predominant at one moment or another of the well production or during the startup of a well. For example, in the case of heavy oil, it is common to inject 60-70% of the diluent initially to start relieving the column and reduce the friction.

Later this can be reduced significantly, for example, to 20-30%, depending on the type of oil and diluent used.

Figure 1:
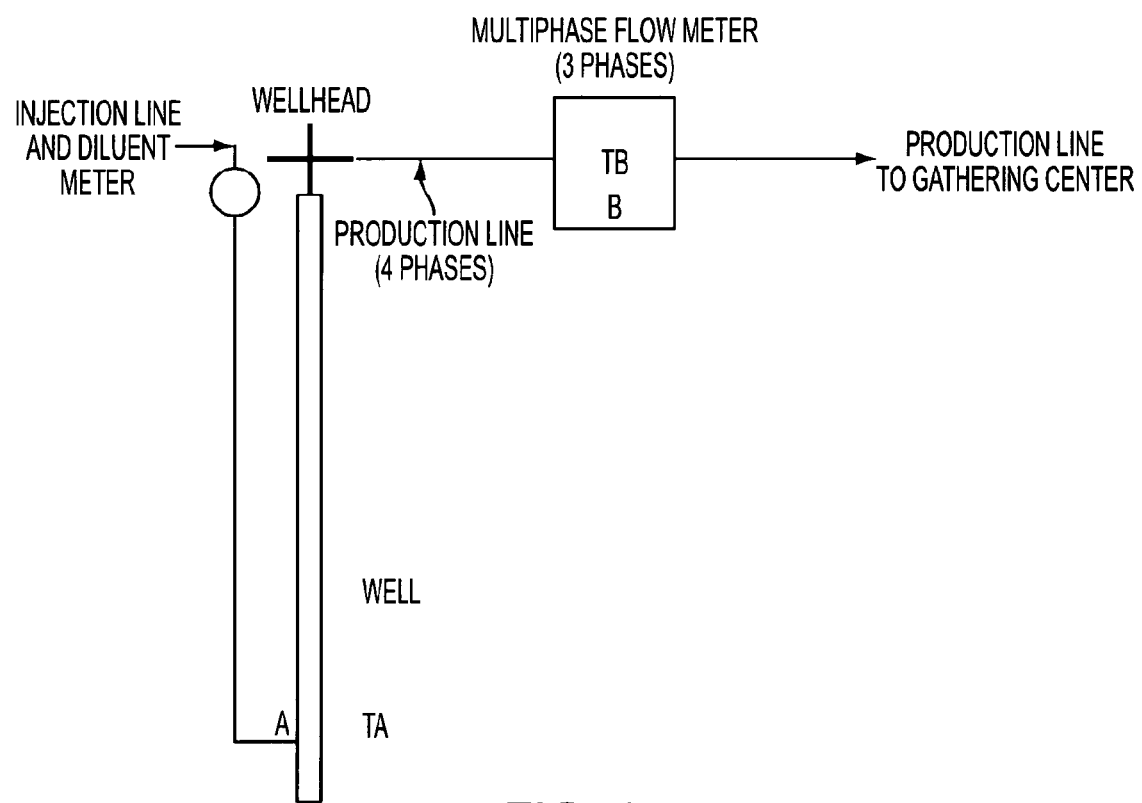
FIG. 1 illustrates a background art system for measuring fluid properties of four phase fluid flow with injection of diluent downhole.
Figure 2:
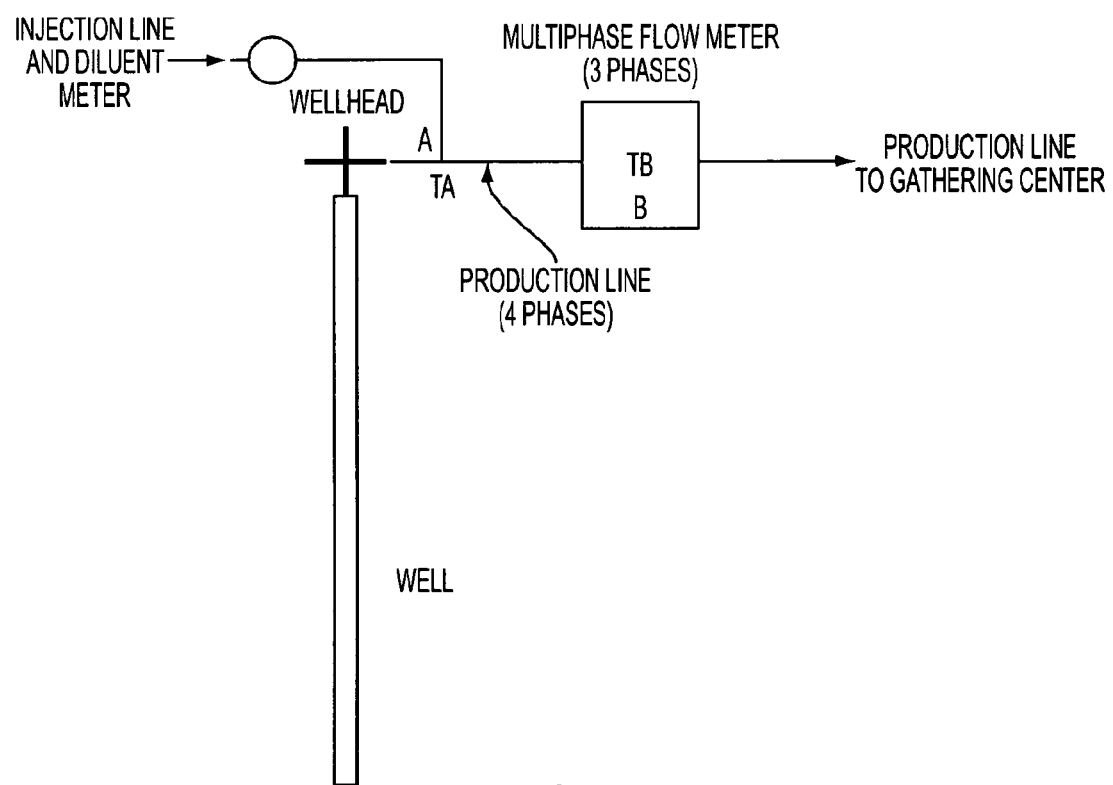
FIG. 2 illustrates a background art system for measuring fluid properties of four phase fluid flow with surface injection of diluent.

Currently there is no system on the market today capable of measuring the production in real-time of these four phases (e.g., called a multiphase flow meter) in a simple and compact manner. Heretofore, the pragmatic solution has been to measure the injection rate of diluent somewhere in a production pipe, for example, at point A and at a time TA, then assume a certain mix process between point A and a point B, and then at point B and at a time TB measure the different phases. Examples of different background art scenarios corresponding to the above-described systems and methods are illustrated in FIGS. 1 and 2. From a theoretical point of view, such approaches can be correct, only if everything is constant in terms of flow rate injection, and the fluid produced from the well. Unfortunately, there are large fluctuations in this type of well. The diluent, for example, is shared among several wells in the field, and fluctuation of more than +/−15% is common on each injection point. As will be appreciated, this can have some major effects on the fluid behavior. Moreover, the injection rate determined at time TA can be different than the rate at time TB determined during the measurement of the three phases. Correction should be applied to take into account the delay between injection and measurement points, and because flow rate is largely turbulent and fluctuating, and no information about the process between A and B is known, it is only the use of a mean velocity based on a measurement at point B that can be applied in order to compensate for the time that the diluent takes to flow from the point A to B, as can be appreciated from FIGS. 1-2. In any case, such a process is not easy to implement, leaving the market with an important need for improvement.

Several hypotheses, as later describe, are performed with the above methods and systems and as will be seen, they cannot be justified throughout the entire production of heavy oil wells. As such, a need exists for systems and methods capable of measuring at the same time, and at the same space, the four phases, in real-time, and that provide a fair acquisition frequency (e.g., in order to be able to capture the fluctuation of the wells), the fractions, flow rates, and fluid properties behavior of the four phases.

To address the issue of the production and monitoring today, most of the background art systems and methods are based on the use of a large separator used to estimate, in the best case, the flow of oil and diluent, water and gas. Then by sampling, such systems and methods will try to identify the fraction of oil produced or by using extra measuring equipment they can estimate the diluent from the mixture of Oil-Diluent. Such systems and methods require a large investment, due to the size of the equipment. In addition, they are subject to many issues in terms of accuracy and labor intensity, as further described.

Multiphase flow meters have become more accepted in the oil industry as an alternative to the background art use of a separator. Moreover, oil production has began to focus more on the two extreme scales of the API, high API (e.g., low density) leading to development of some specific solutions for the gas condensate, and low API characterized by Heavy Oil, Extra Heavy Oil, Bitumen. The latter type of API is believed to represent the future of the production in the oil industry around the world. However, there are some fundamental problems in producing this type of fluid. For example, for cold production, it is necessary to add a diluent in this mixture of oil, water, and gas in order to reduce the friction of the main flow against the pipe. This added fourth phase has caused challenges to background art equipment, as well as the latest multiphase technology on the market. One proposed solution has been to add sensors that will cope with this fourth phase. However, the addition of sensors alone can be rather complex.

The multiphase flow metering industry has become quite successful over the last ten years, but is still an area of development of new ideas, which have been accepted slowly by the oil industry. A consolidation of the business has led to the acceptance of several technologies that have been shown to work in the "common" multiphase flow consisting of three phases: oil, water, and gas (e.g., not including viscous fluid). Accepted technologies can be summarized as being based on either dual energy gamma ray (e.g., nuclear measurement linked to the attenuation of the gamma ray passing through one flowing fluid) or electromagnetic measurement (e.g., resistivity and conductivity, or more generally impedance measurement), which in both cases allow differentiation of the 3 phases. Combinations of these two technologies have also been employed. The majority of these technologies have been installed in gas wells or in oil wells with a liquid viscosity generally lower than 500-1,000 cP (e.g., at line conditions).

Due to the limited amount of conventional oil available and the increasing rate of consumption, there exists a need to produce heavy oil, which is more viscous, and which may require the addition a diluent in the mixture of oil, water, and gas in order to reduce the friction of the main flow against the pipe. Therefore, to facilitate the mobility of this type of heavy oil, which can be compared to peanut butter or toothpaste in terms of viscosity behavior, the exemplary systems and methods of the present disclosure can be used for the multiphase flow metering industry in addressing the above and other discovered problems resulting from the added fourth phase. Additionally, an aspect of the exemplary systems and methods of the present disclosure address the remoteness of hydrocarbon reserves and incorporate the concept of maintenance free use coupled with increased reliability and robustness. Advantageously, the exemplary systems and methods need not employ moving parts or flow calibration at the well site.

Another challenge exists with the sand from a formation in some reservoirs where the production of heavy oil is performed. For example, the sand content of such productions can be as high as 10%, which may also lead to a change in the viscosity behavior of the fluid without the solid production. Issues and challenges with oil monitoring and management of these types of reservoirs are leading to a decreased interest in this type of production. Up to now, no proper solution has been found.

The traditional or conventional approach to solving this problem is to use a big separator, which in the best case scenario will provide the oil/diluent mixture flow rate, and due to the separation process, the water and gas flow rates. Most of the time, however, the liquid is mixed and only a two-phase separation is possible between the gas and liquid (e.g., water, oil and diluent together or water, oil and sand). In practice, only a partial separation is done in the separator, which indeed includes some of the gas bubbles trapped inside the liquid and which cannot migrate to the top of the interface gas/liquid in the separator due either to the retention time being too short or due to the lack of mobility of the gas due to the presence of a liquid emulsion. Additionally, without adding a demulsifier to try to break the oil-diluent-water mixture, it is difficult, if not impossible, to access the hydrocarbon and water production separately.

As described above, the background art solutions require an additional amount of chemical fluid to differentiate the produced phases, and the use of a large separator. Additionally, some specific processing methods should be in place to recover some of the demulsifier used in the separation process in order to reduce the entire operation expenditure.

Furthermore, as previously described, multiphase flow meters for three phases have been in development and commercially available for roughly 15 years, while the metering of four phases has been considered only recently. There have been numerous patents and patent applications published on specific aspects of this development, which will be further discussed. In general, most of the focus in fourth phase measurement has been on the salinity measurement. Many of the solutions proposed consider the fourth phase as dissolved in one of the other phases, and having no impact on the fluid behavior from a fluid mechanics point of view (e.g., such as when salt is dissolved inside of water). In other words, it is assumed that the fourth phase has a negligible effect on the flow structure or the behavior of the mixture (e.g., viscosity of the mixture). This assumption has been taken as premise in most, if not all, developments. For example, International Patent Application WO 1997/042493, incorporated by reference herein, describes a specific solution to the problem of four phase metering with salt, and demonstrates issues in the measurement of the fourth phase requiring long periods of averaging to achieve in some cases a salinity measurement. Another example is illustrated by Great Britain Patent No. GB 2316167, incorporated by reference herein, directed to a method of calculating the salt content of water. There are numerous patent publications of ROUX et al. (e.g., EP Patent Application No. EP 1 862 781 A1, and US Patent Application No. 2007/0287190 A1, assigned to SCHLUMBERGER, incorporated by reference herein) that have addressed the concentration of salinity in four phase flow. More recently, patent publications of PINGUET et al. (e.g., EP Patent Application No. EP 1 970 702 A1, and PCT Patent Application No. PCT/IB2009/050365, assigned to SCHLUMBERGER, incorporated by reference herein) disclose an approach to the problem of a solid flowing in the main pipe with the three main phases, as well as the problem of sand concentration, and the deposition of asphaltene or scale or wax inside the pipe.

The approach in the background art can be summarized as either considering the fourth phase as dissolved, or as solid. An aspect of the present disclosure builds on the background art by considering the fourth phase as having a more significant impact on the fluid behavior, and takes into account such effect. Another aspect of the present disclosure addresses the diluent in a similar way as the presence of a large amount of solid (e.g., 10% sand inside the oil), which may act to fundamentally change the viscosity of the liquid/sand mixture like in the case of CHOPS production with sand fraction within 10-40% in the early life of the well.

It is therefore desirable to provide a method and apparatus (e.g., which also can be referred to herein as a "system") that addresses the above and other problems. The proposed solution may incorporate certain features of the background art mentioned above, but extends to the effect on some fluid behaviors, and to the application and cases essentially with the presence of a large quantity of a fourth phase not approached by the background art. The present disclosure also addresses the presence of diluent as never considered before and as having some specificity in a multiphase flow. Furthermore, the present disclosure addresses applications in Heavy Oil, making such a solution unique and innovative.

The background art systems and methods are unable to measure four phases (e.g., at a minimum) at the same place, and at the same time. Moreover, heavy oil is usually produced as a foam or emulsion and this adds another challenge to the entire measurement of flow rates. To be able to answer these first challenges, the exemplary systems and methods interact with different fluids passing through a meter and work at a scale, which is smaller than the tiniest structure of the flow. The smallest structures are usually the gas bubbles trapped inside the liquid and the size could be estimated in the range of 0.5 mm diameter, wherein with a safety factor employed, the exemplary systems and methods can interact with the fluid at a scale of around a hundredth of a nanometer. Furthermore, the exemplary acquisition systems and methods can be sensitive to several different properties of the mix fluid and can include one dedicated interaction to specific properties of each fluid (e.g., diluent, oil, water, and gas). Finally, the exemplary the exemplary systems and methods can be made compact to be able to measure, instantaneously the different fractions of the multiphase flow, advantageously, without employing-moving parts and without a need for calibration at a well site.

Such exemplary systems and methods can be based on optical and/or nuclear technologies with several wavelength or identical energy levels that can interact specifically with some intrinsic properties of the fluid or some specific signature of dedicated properties of each fluid.

Figure 3:
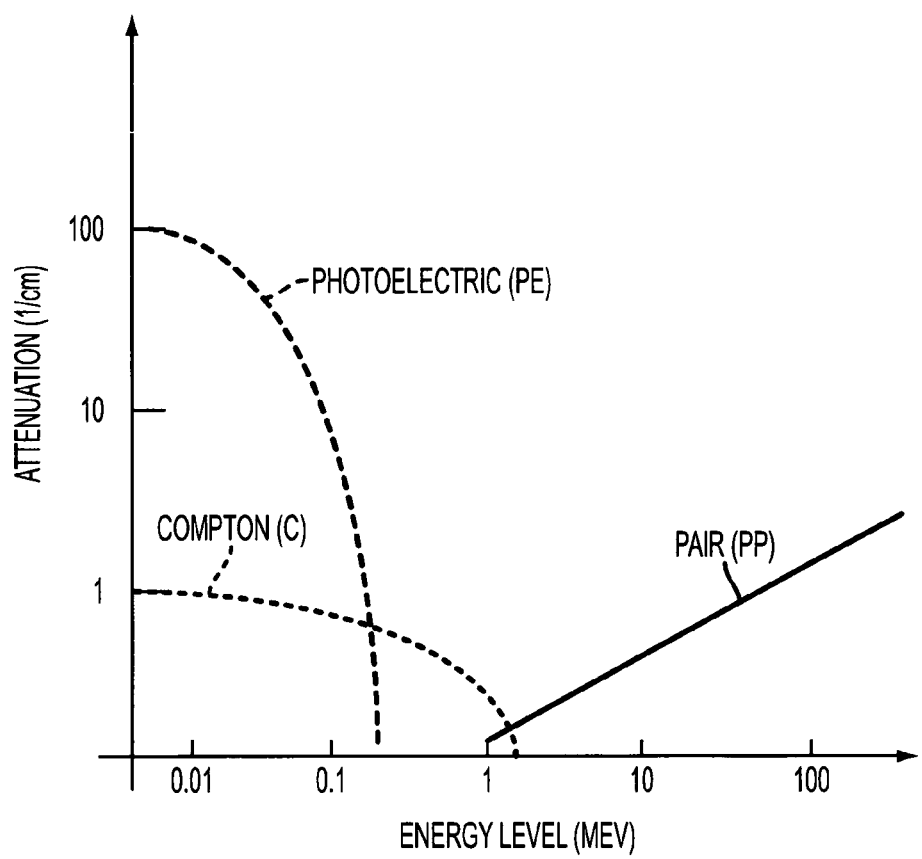
FIG. 3 is a graph illustrating nuclear versus energy level interactions.

In an exemplary embodiment, the exemplary systems and methods can be based on nuclear measurement, due to some intrinsic properties employed in the solution to the above-noted and other problems with background art systems and methods. From a physics point of view, the gamma ray attenuation that results from the interaction between penetrating radiation and matter is not a simple process. A single interaction event between a primary γx-ray photon and a particle of matter does not usually result in the photon changing to some other form of energy and effectively disappearing. Several interaction events are usually involved and the total attenuation is the sum of the attenuation due to different types of interactions. These interactions include the photoelectric effect, scattering, and pair production. FIG. 3 illustrates an approximation of the main range of absorption coefficient for each interaction as a function of radiation energy. Each of the three radiation-matter interactions that contribute to the total absorption are shown and are the photoelectric effect (PE), Compton scattering effect (C), pair production (PP). Typical industrial systems can work today in the range of 0.01 to 1.5 MeV without any problem. It can be seen from the plot that Photoelectric and Compton scattering account for the majority of attenuation encountered.

The photoelectric (PE) absorption of γx-rays occurs when the γx-ray photon is absorbed, resulting in the ejection of electrons from the outer shell of the atom, and hence the ionization of the atom. Subsequently, the ionized atom returns to the neutral state with the emission of a γx-ray characteristic of the atom. This subsequent emission of lower energy photons is generally absorbed. Photoelectron absorption is the dominant process for γx-ray absorption up to energies of about 500 keV. Photoelectron absorption is also dominant for atoms of high atomic numbers, such as the $H_2S$, for example, or the Salt present inside water.

Compton scattering (C) occurs when an incident γx-ray photon is deflected from its original path by an interaction with an electron. The electron gains energy and is ejected from its orbital position. The γx-ray photon loses energy due to the interaction but continues to travel through the material along an altered path. Since the scattered γx-ray photon has less energy, it, therefore, has a longer wavelength than the incident photon. The event is also known as incoherent scattering because the photon energy change resulting from an interaction is not always orderly and consistent. The energy shift depends on the angle of scattering and not on the nature of the scattering medium.

Pair production (PP) can occur when an γx-ray photon energy is greater than 1.02 MeV, but really only becomes significant at much higher energies (e.g., at ~10 MeV). Pair production occurs when an electron and positron are created with the annihilation of the γx-ray photon. Positrons are very short lived and disappear (e.g., by positron annihilation) with the formation of two photons of 0.51 MeV energy. Pair production is of particular importance when high-energy photons pass through materials of a high atomic number.

Meanwhile, from a safety point of view, the higher the energy level, the more important shielding needs to be in order to avoid any unwanted radiation. It is therefore from a practical point of view better to avoid using radiation above a limit within a range of 0.5 to 1 MeV, wherein the cost of the shielding makes such a solution less attractive and more dangerous from a radiation point of view, including issues with respect to being "Environment Friendly." It is therefore in the range of 10 keV to 1,000 keV that the nuclear device should work and this will lead one to look at essentially two types of interaction: Compton and Photoelectric. Due to the predominance of each interaction in one area or another it will be interesting to get one energy level as low as possible to be essential in the maximum interaction with the Photoelectric effect, wherein this means lower than 50 keV. The Compton Effect is more predominant above 150 keV. In addition, the most interesting point is in the range from 50 to 150 keV, wherein there is a competition of both effects. One has therefore three ranges of energy with a clearly well defined interaction at each time. Having one energy level in each range will lead one to measure some specific properties of the mixture of the 4 phases flowing through a pipe. It should be noted that only three types of interactions are enough cause the sum of the fractions to be equal to 100%, and indeed this provides a fourth information about the flow and sufficient information to solve a system of four equations with four unknowns.

It is advantageous to note that any energy level selected in the range of 200 to 1000 keV will be measuring the same interaction phenomenon and as such, there is no interest to employ from a practical and safety point of view a higher energy range than 200-600 keV.

Based on such a physical review, how can an exemplary systems and methods generate such different energy levels? In one aspect, the exemplary systems and methods can be based on the use of a generator of X-rays set with some specific energy levels. Such equipment has the advantage of being very selective with respect to the type of energy produced and can be easily transported. However, the stability of such systems and methods may make the solution more complex and affect the overall reliability of the entire multiphase flow meter based thereon. Further exemplary systems and methods can be based on a mix of X-Rays and the use of a radioactive source with one specific energy level or two specific energy levels, such as Cesium. Exemplary systems and methods can employ up to three different radioactive sources having all of the suitable energy levels, wherein at least one main and well-defined energy level is provided, such as with Americium. Finally, the exemplary systems and methods can employ a specific source with several levels of energy. The present disclosure is applicable to the above and other suitable combinations thereof, as will be appreciated by those of ordinary skill in the relevant art(s). Whatever the practical solution, the exemplary systems and methods can determine the three energy peaks in the suitable ranges with the two predominant effects linked with the photoelectric (PE) and the Compton scattering (C) effects and one with the combination of both. Advantageously, a Barium source, which is a combination of more than 9 main energy peaks, can be employed and regrouped in at least 4 main peaks: one around 30 keV, one around 80 keV, one around 160 keV, one around 302 to 383 keV.

Figure 4:
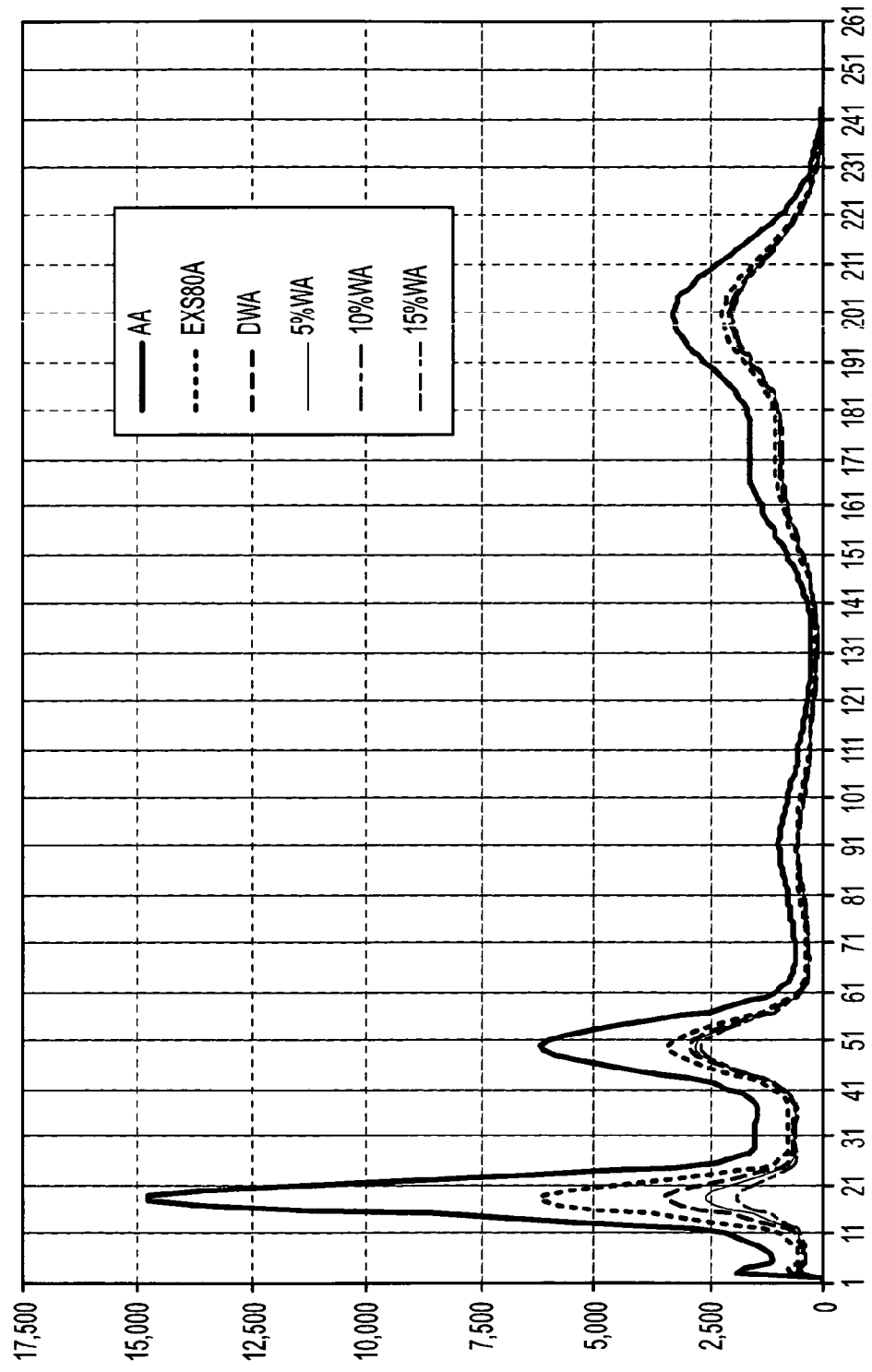
FIG. 4 is a graph illustrating gamma ray spectrum versus energy level interactions.

As previously described, there is no problem with adding several peaks associated with the same phenomenon, for example, at high energy. This is because in this case the measurement is dependent on one specific interaction, and such a summation of several peaks (e.g., for the same range of energy), advantageously, improves the overall measurement. Indeed, the nuclear measurement is based on statistical measurement of counts (e.g., a number of gamma rays not attenuated by the fluid) and as such an increase in the number of detected counts in one given window of energy provides better statistics, which is beneficial for the overall measurement accuracy. The above-mentioned peak around 160 keV, as presented in FIG. 4, is quite small in terms of detected counts, even in air, which leads to poor statistics, and as such can be avoided to be used with such a source. Finally, in the context of the nuclear measurement that is based on statistical measurements, in each window solely one energy peak can be considered. Advantageously, by employing, for example, Barium, three main peaks in three different ranges of energy level are provided.

The exemplary systems and methods, however, are not limited to only the use of one source, but rather are described as such merely for exemplary purposes. Accordingly, the exemplary systems and methods merely illustrate how systems and methods can be implemented with one radioactive element source, for example, in order to reduce the complexity of the entire multiphase flow meter systems and methods, as can be advantageous in the market.

The interaction of the nuclear system with a fluid constituted of four components can be then summarized by the set of equations (1), for example, shown below (e.g., as described in PCT Patent No. WO 1997/042493 directed to salinity detection, incorporated by reference herein):

$$\begin{cases} \frac{-1}{d}\ln\left(\frac{N^i}{N_o^i}\right) = \sum \rho_j \cdot v_j^i \cdot \alpha_j \\ \frac{-1}{d}\ln\left(\frac{N^k}{N_o^k}\right) = \sum \rho_j \cdot v_j^k \cdot \alpha_j \\ \frac{-1}{d}\ln\left(\frac{N^l}{N_o^l}\right) = \sum \rho_j \cdot v_j^l \cdot \alpha_j \\ \sum \alpha_j = 1 \end{cases} \quad (1)$$

With this formulation, wherein j represents oil, water, gas, and diluent, the access to the a $4^{th}$ unknown is possible.

Another aspect of the present disclosure is use of the fact that the third energy can be modeled per the below equation (2), which expresses that the highest level of energy is essentially interacting with the mixture density. To be more specific, (e.g., as described in EP Patent No. EP 1862 781 A1, to ROUX et al., assigned to SCHLUMBERGER, incorporated by reference herein) it has been found that this interaction can be linked to the electronic density of the mixture:

$$-K \cdot \ln\left(\frac{N^l}{N_o^l}\right) = \rho_e \quad (2)$$

Figure 5:
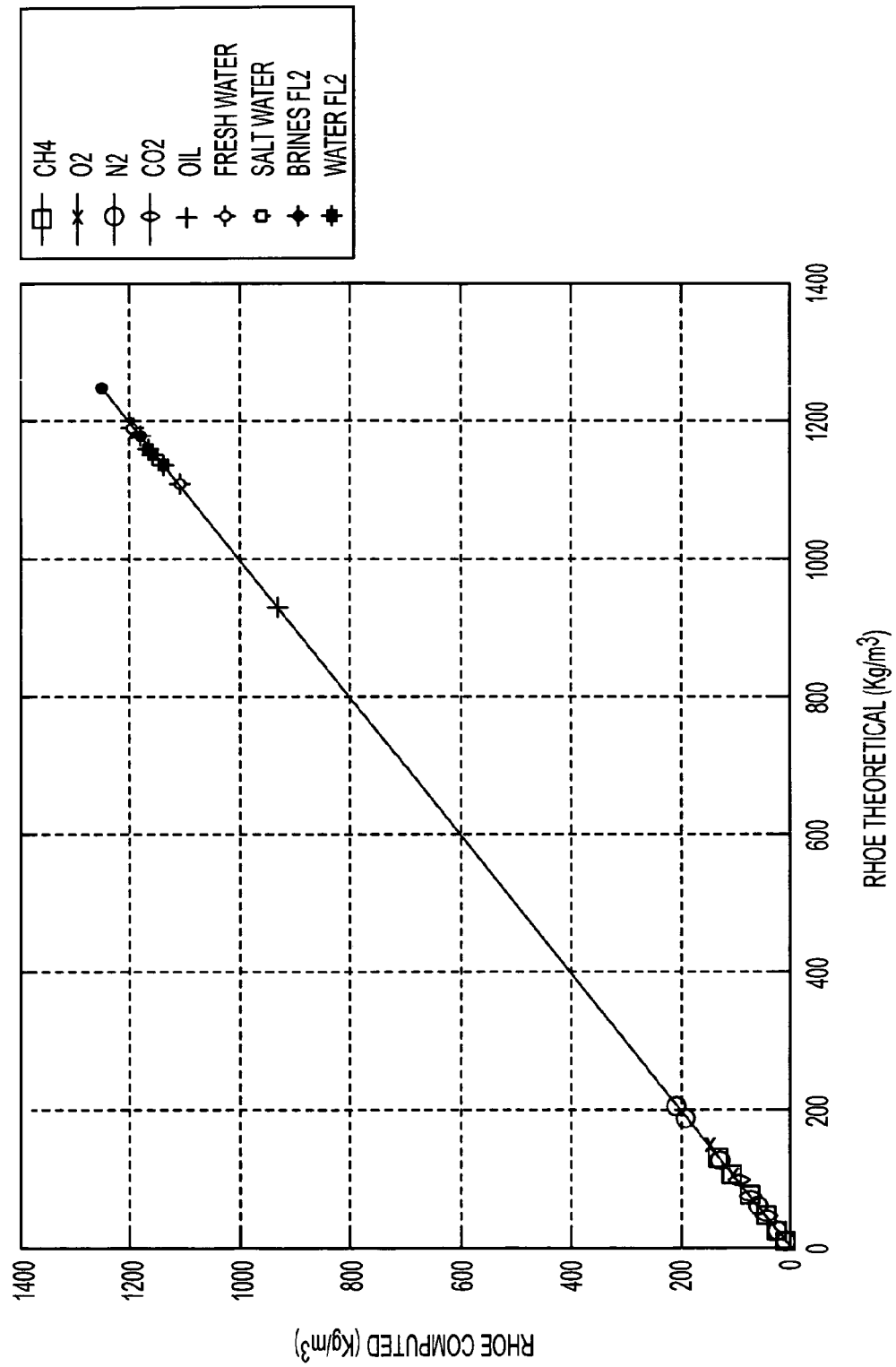
FIG. 5 is a graph illustrating electronic density versus theoretical interactions.

A set of data confirming the pertinence of the equation (2) is shown in FIG. 5.

The overall performance of the density measurement versus the theoretical value has been shown to be better than +/−1.5-2 kg/m³ in the entire range of fluid tested from pure gas (e.g. at low pressure) up to a value in the range of 1,300 kg/m³. The electronic density can be expressed as a function of the classical density (e.g., in terms of mass) and the ratio of electrons (e.g., given as Z) and the number of protons and neutron (e.g., given as A), as presented in the below equation (3):

$$-K \cdot \ln\left(\frac{N^l}{N_o^l}\right) = \rho_e = \left(\frac{2Z}{A}\right)_m \cdot \rho_m \quad (3)$$

with the subscript m representing the mixture of the 4 phases.

Using the definition of the mixture density, equation (3) can be expressed by:

$$-K \cdot \ln\left(\frac{N^l}{N_o^l}\right) = \rho_e = \left(\frac{2Z}{A}\right)_m \cdot \sum \rho_j \cdot \alpha_j \quad (4)$$

If there are two ways of modeling the third energy interaction, from a mathematical point of view, with equations (1) and (4), this leads to the below equation (5), wherein there is from a physics point of view one better way than the other to achieve accurate results:

$$\ln\left(\frac{N^l}{N_o^l}\right) = \frac{-1}{K} \cdot \left(\frac{2Z}{A}\right)_m \cdot \sum \rho_j \cdot \alpha_j = -d \cdot \sum v_j^l \rho_j \cdot \alpha_j \quad (5)$$

Figure 6:
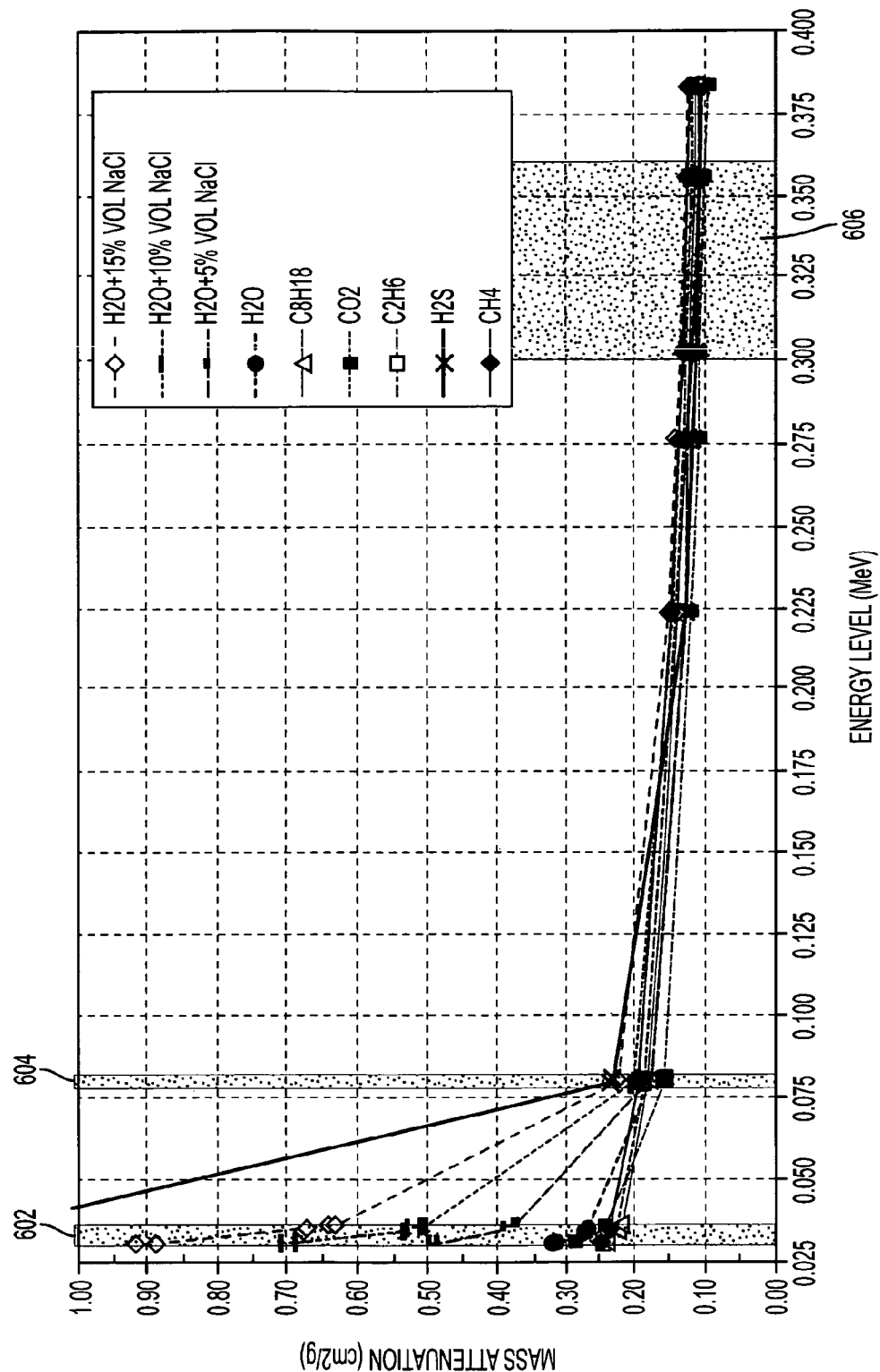
FIG. 6 is a graph illustrating mass attenuation versus energy level interactions.

One interesting observation from the equation (5) is that it defines the mass attenuation of the third energy level as a constant, regardless of the composition of each phase. This is confirmed by the theoretical calculation, as presented in the FIG. 6. In FIG. 6, elements 602-606 represent the possible acquisition windows versus the different energy levels. The highest energy level window 606 is wider and the mass attenuation is constant in this range, as can be seen from FIG. 6.

If from a mathematical point of view such an equation system can be solved in two manners, some physics formulations will demonstrate that the robustness of the system of four equations and four unknowns is better defined only in one case. For example, if we look at the system of equations (1), this system of equations requires seven new input parameters that include the three mass attenuation parameters of the highest energy level for oil, water, and gas, the three mass attenuation parameters at different energy levels for the 4$^{th}$ phase, and finally the parameter regarding the density of the 4$^{th}$ phase. This can be expressed by the below equation (6):

$$\begin{bmatrix} \alpha_o \\ \alpha_g \\ \alpha_w \\ \alpha_d \end{bmatrix} = fn(\rho_w, \rho_o, \rho_g, \rho_d, v_w^{le}, v_o^{le}, v_g^{le}, v_d^{le}, \quad (6)$$

$$v_w^{he}, v_o^{he}, v_g^{he}, v_d^{he}, v_w^{HHE}, v_o^{HHE}, v_g^{HHE}, v_d^{HHE}) \begin{bmatrix} 1 \\ N_{le} \\ N_{he} \\ N_{HHE} \end{bmatrix}$$

The second option, based on the direct density measurement, employs only three new parameters that include the mass attenuation of the 4$^{th}$ phase for the low and high energy, and the associated density, and which can be expressed by the below equation (7):

$$\begin{bmatrix} \alpha_o \\ \alpha_g \\ \alpha_w \\ \alpha_d \end{bmatrix} = fn(\rho_w, \rho_o, \rho_g, \rho_d, v_w^{le}, v_o^{le}, v_g^{le}, v_d^{le}, v_w^{he}, v_o^{he}, v_g^{he}, v_d^{he}) \begin{bmatrix} 1 \\ N_{le} \\ N_{he} \\ N_{HHE} \end{bmatrix} \quad (7)$$

Knowing now from a physical point of view that any new input parameters have their own intrinsic error, reducing the number of input parameters will introduce less uncertainty and thus provide a computed measurement with better resolution and less uncertainty. Therefore, it is preferable to select a solution using the electronic density. Accordingly, the set of equations (2) can be rewritten as the below equations (8) and (9):

$$\begin{cases} \frac{-1}{d}\ln\left(\frac{N^i}{N_o^i}\right) = \sum \rho_j \cdot v_j^i \cdot \alpha_j \\ \frac{-1}{d}\ln\left(\frac{N^k}{N_o^k}\right) = \sum \rho_j \cdot v_j^k \cdot \alpha_j \\ -K\ln\left(\frac{N^l}{N_o^l}\right) = \left(\frac{2 \cdot Z}{A}\right)_{mix} \cdot \rho_{mix} \\ \sum \alpha_j = 1 \end{cases} \quad (8)$$

and:

$$\begin{cases} \frac{-1}{d}\ln\left(\frac{N^i}{N_o^i}\right) = \sum \rho_j \cdot v_j^i \cdot \alpha_j \\ \frac{-1}{d}\ln\left(\frac{N^k}{N_o^k}\right) = \sum \rho_j \cdot v_j^k \cdot \alpha_j \\ -K\ln\left(\frac{N^l}{N_o^l}\right) = \sum \left(\frac{2 \cdot Z}{A}\right)_j \cdot \rho_j \cdot \alpha_j \\ \sum \alpha_j = 1 \end{cases} \quad (9)$$

As the system of equation (9) is written, a knowledge of new parameter "2Z/A" for each fluid is employed. However, this parameter can be obtained, because it is already accessible during, for example, the in-situ measurement to get the mass attenuation of the two first levels of energy or it can be determined from the known composition of each phase. During the in-situ measurement, the recording of the highest energy is already available, as being used to linearize the two lowest energy peaks and to correct for the linearization of the different energy peaks. This is a procedure well known in the nuclear arts. Moreover, the fluid density is an input parameter for the two mass attenuation parameters of the lowest energy level. Therefore, the ratio 2Z/A can be obtained, as presented in the below set of equations (10):

$$\begin{cases} \frac{-1}{d \cdot \rho_j} \ln\left(\frac{N^i}{N_o^i}\right) = \cdot v_j^i \\ \frac{-1}{d \cdot \rho_j} \ln\left(\frac{N^k}{N_o^k}\right) = v_j^k \\ -\frac{K}{\rho_j} \ln\left(\frac{N^l}{N_o^l}\right) \cdot = \frac{2 \cdot Z}{A} \\ \alpha_j = 1 \end{cases} \quad (10)$$

Another advantage based on the physics and studies of the present disclosure is highlighted by some extreme examples is that the ratio 2Z/A is quite constant versus composition change. For example, for different type of oils, from very light to heavy, 2Z/A is fluctuating in the range from 1.141 to 1.155 (e.g., or less than 1.3% relative variation). The 2Z/A variation is in a range of 1.110-1.080 (e.g., or less than 2.8% relative variation) versus the salinity change from 0 to 20% NaCl equivalent. Because the 2Z/A value is very stable, it can be used as a first indicator to verify the quality of the in-situ of any suitable phase (e.g., oil, water, or gas). Furthermore, the density of the liquid of each fluid phase are usually known at better than +/−1-2 kg/m$^3$ with standard densitometer, and the K factor (e.g., from equation (3)) is known at better than 0.2%. Therefore, the relative error of the 2Z/A measurement is within 0.2%. Advantageously, this demonstrates an improved way to measure the mass density by using the stability of the density electronics.

For example, in the case of gas, at a given $CH_4$ concentration (e.g., at 75%) and with the other part of the composition being $C_2$ or $C_3$ or $C_4$, this leads to a variation of the 2Z/A gas mixture within 1.234 to 1.227 or less than 0.5% relative variation.

If 10% of the $C_4$ is replaced by 10% of $H_2S$ (e.g., a composition of $CH_4$: 75%, $C_4H_{10}$: 15%, and $H_2S$: 10%), this leads to a 2Z/A mixture varying from 1.227 to 1.216 (e.g., 0.9% relative variation). This shows the advantage of such a measurement of the 2Z/A parameter, irrespective of the change in the composition for a given $CH_4$ composition. This also demonstrates a novel way to measure the mass density by using the stability of the density electronics.

Based on the above description, the use of the exemplary systems and methods with a third energy gamma ray or X-ray is advantageous to implement in any suitable systems and methods already employing nuclear measurements. This can be done by adding a higher energy level, such as by combining several radioactive sources with different energy levels in the three areas, including an area below 50 keV, an area between 50 and 150 keV, and an area above 150 keV. Another fundamental advantage of the exemplary systems and methods is that the highest, third energy level of the gamma rays allows measuring directly the density of the mixture with no need to calculate the density, based on the fractional measurements, with, for example, the below equation (11):

$$\rho_m = \Sigma \rho_j \cdot \alpha_j \quad (11)$$

The exemplary systems and methods employing the third energy level, advantageously, provide better accuracy in the measurement of the mixture (e.g., oil, water, gas and diluent), wherein studies performed have demonstrated the robustness and quality of the density measurement for any suitable type of fluid, and with accuracy well within the 1.5-2 kg/m$^3$ range. This is around 5 times better than the uncertainty from the use of the two first energy peaks, as will be further described.

Finally, as shown by some extreme cases previously presented, based on the sensitivity analysis, the electronic density fluctuates very little versus a large change in the $H_2S$ or Salt composition or any suitable atoms having a large atomic number, which could be present inside the flow. This highlights the advantage of using this highest energy peak to obtain a 4$^{th}$ unknown in a multiphase flow.

Figure 7:
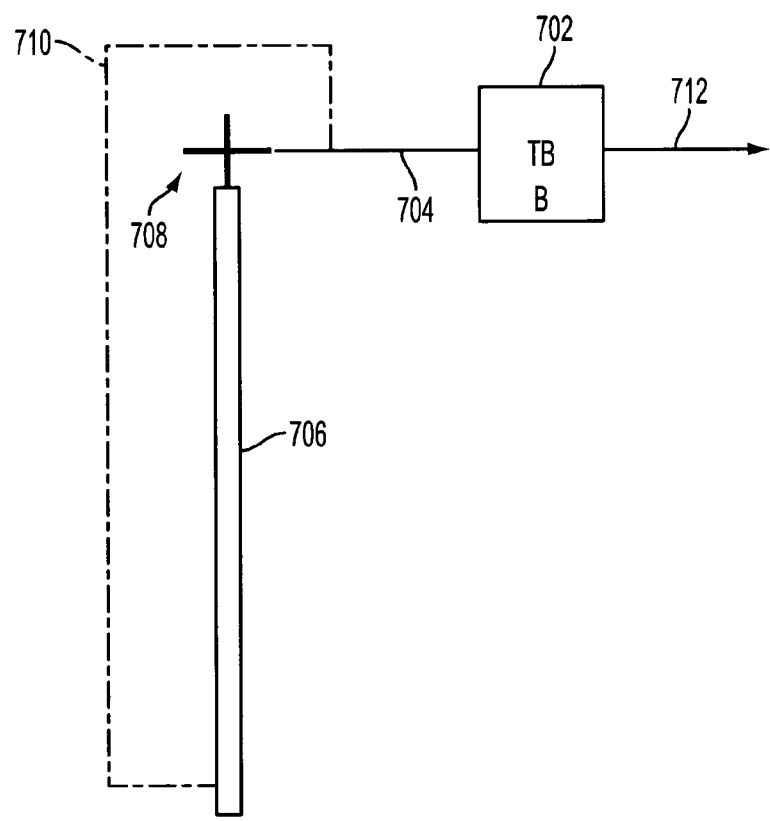
FIG. 7 is used to illustrate exemplary systems and methods for measuring fluid properties of four phase fluid flow independent of diluent injection level in accordance with exemplary embodiments disclosed herein.

FIG. 7 is used to illustrate exemplary systems and methods for measuring fluid properties of four phase fluid flow independent of diluent injection level in accordance with exemplary embodiments disclosed herein. In FIG. 7, the exemplary systems and methods can include a multiphase flow meter 702 that can provide information regarding four phases of fluid in a production line 704 plus a fluid behavior model thereof, as previously described, for a well 706 having a wellhead 708. Advantageously, only a single measurement time TB at point B need be employed, as compared to the background art systems and methods of FIGS. 1-2. As shown in FIG. 7, no diluent meter need be employed in the injection line 710. The output from the multiphase flow meter 702 can be provided via production line 712 to a gathering center (not shown).

With the exemplary systems and methods of FIG. 7, it is therefore possible through the resolution of the set of equations (9) to get an accurate measurement of the 4$^{th}$ phase as a predominant or non-predominant phase (e.g., concentration) versus the others phases. Furthermore, all phases (e.g., fractions thereof) can be measured in the same space, at the same time, and irrespective of the mixture or flow structure (e.g., dispersed phase, emulsion, foaming, etc.). Finally, this strategy of nuclear measurement can be performed at a usable acquisition frequency (e.g., in the range of several tenth of Hz) in order to be able to capture the possible fluctuation of the flow composition versus time or the chaotic behavior of the flow (e.g., intermittent, slug, plug, etc.). The exemplary systems and methods, as described above, advantageously, provide a most compact four phase, multiphase flow meter with the great robustness. An advantage of the exemplary systems and methods is that they are used independent of the flow rate measurement of the diluent injection, and avoid the issue of the correlation existing between the injection rate and the flow measured made somewhere else on the main pipe.

Figure 8:
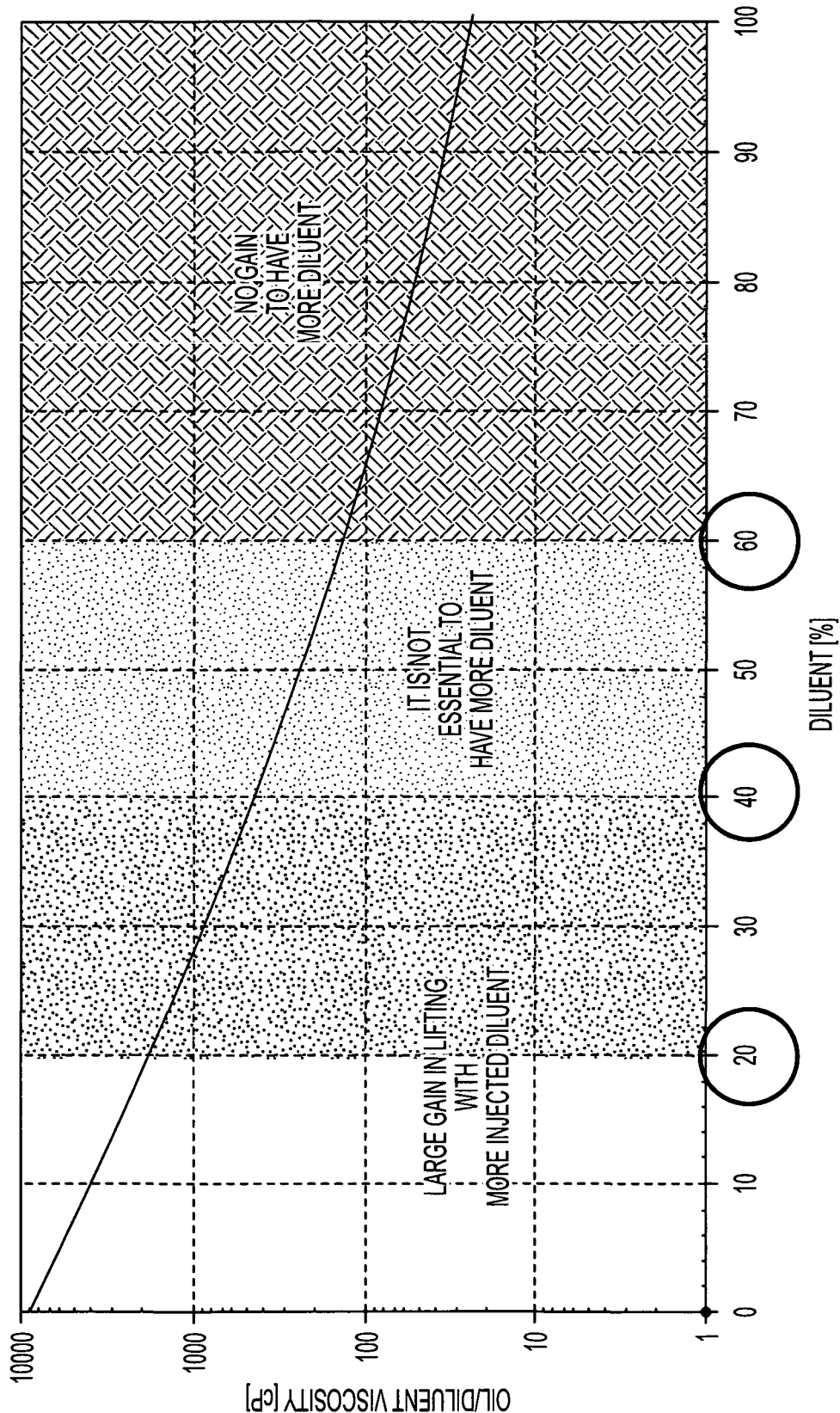
FIG. 8 is a graph illustrating viscosity variation of oil-diluent mixture versus diluent concentration for illustrating the exemplary systems and methods for measuring fluid properties of four phase fluid in accordance with exemplary embodiments disclosed herein.

In a further exemplary embodiment, the exemplary systems and methods can provide an overall high accuracy flow rate measurement by adding to the nuclear measurements some additional information about the flow behavior. For example, the diluent injection and concentration can change drastically the fluid behavior. FIG. 8 shows an exemplary graph of oil viscosity values versus diluent concentration. As shown in FIG. 8, a large viscosity change is obtained versus the diluent concentration specifically within the range of 0 to 40%. A variation of 15% of the concentration can lead, in this range of concentration of diluent, to a viscosity change by a factor 10.

From FIG. 8, it also can be seen that the gain of large injection of diluent is less important, for example, above 40% of diluent present in the oil, and from an economical and viscosity value point of view, any concentration above a certain value (e.g., ~60% in this example) does not make any significant improvement in the fluid mobility. This statement can be understood by the fact that the viscosity value at a certain level, depending on the technology, has no or very little impact on the overall performance of the multiphase meter. The innovative solution based on the nuclear technology can be used to control the diluent injection rate with a very high accuracy in order to keep the concentration to an optimal value. This optimization can be different depending on the oil, diluent properties, and other phenomena linked with superficial tension and as defined at the early stages of well production.

Figure 9:
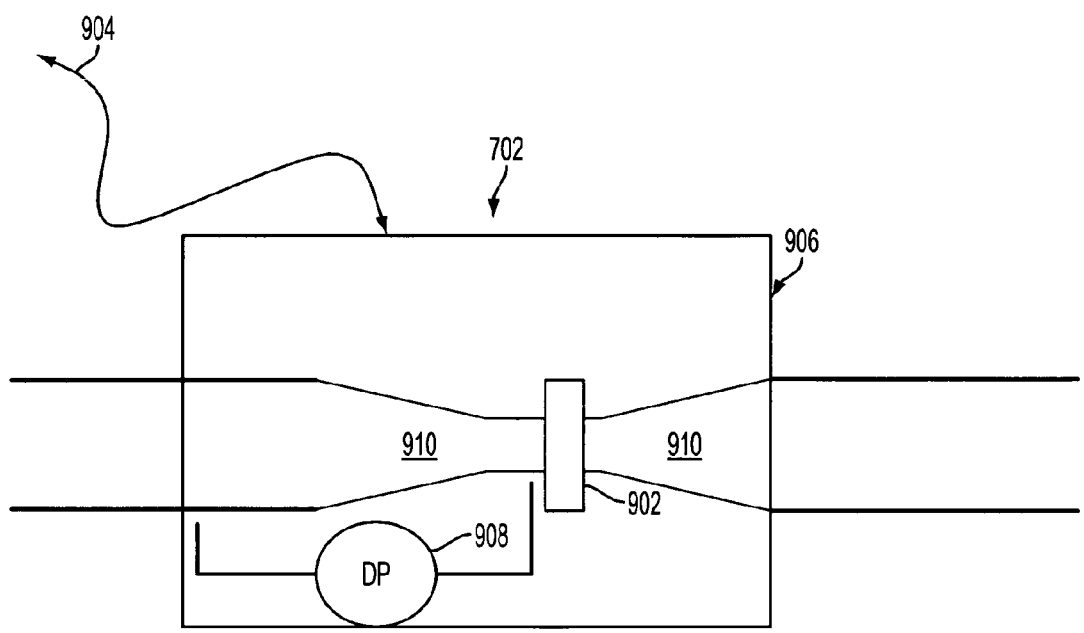
FIG. 9 is used to illustrate exemplary systems and methods for measuring fluid properties of four phase fluid flow with venturi measurement and nuclear measurement at a venturi throat in accordance with exemplary embodiments disclosed herein.

FIG. 9 is used to illustrate exemplary systems and methods for measuring fluid properties of four phase fluid flow with venturi measurement and nuclear measurement at a venturi throat in accordance with exemplary embodiments disclosed herein. In FIG. 9, the exemplary systems and methods include the multiphase flow meter 702, a four phase nuclear subsystem 902, a bidirectional communications system 904 (e.g., for transmitting information to/from the multiphase flow meter 702), embedded fluid behavior modeling 906, a differential pressure (DP) sensor 908, and venturi 910. As shown in FIG. 9, the nuclear subsystem 902 and the differential pressure (DP) sensor 908 can be located at the throat of the venturi 910.

Figure 10:
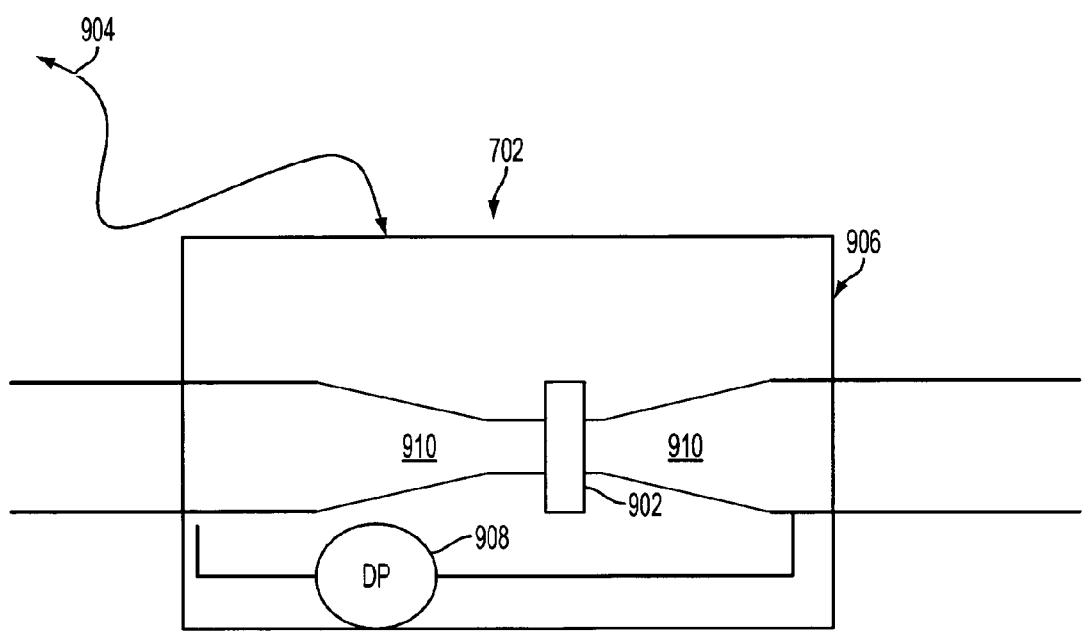
FIG. 10 is used to illustrate exemplary systems and methods for measuring fluid properties of four phase fluid flow with venturi measurement and total differential pressure (DP) measurement and nuclear measurement at a venturi throat in accordance with exemplary embodiments disclosed herein.

FIG. 10 is used to illustrate exemplary systems and methods for measuring fluid properties of four phase fluid flow with venturi measurement and total differential pressure (DP) measurement and nuclear measurement at a venturi throat in accordance with exemplary embodiments disclosed herein. The exemplary systems and methods of FIG. 10 operate in a similar manner as those of FIG. 9, except the differential pressure (DP) sensor 908 senses the total differential pressure across the entire venturi 910.

Figure 11:
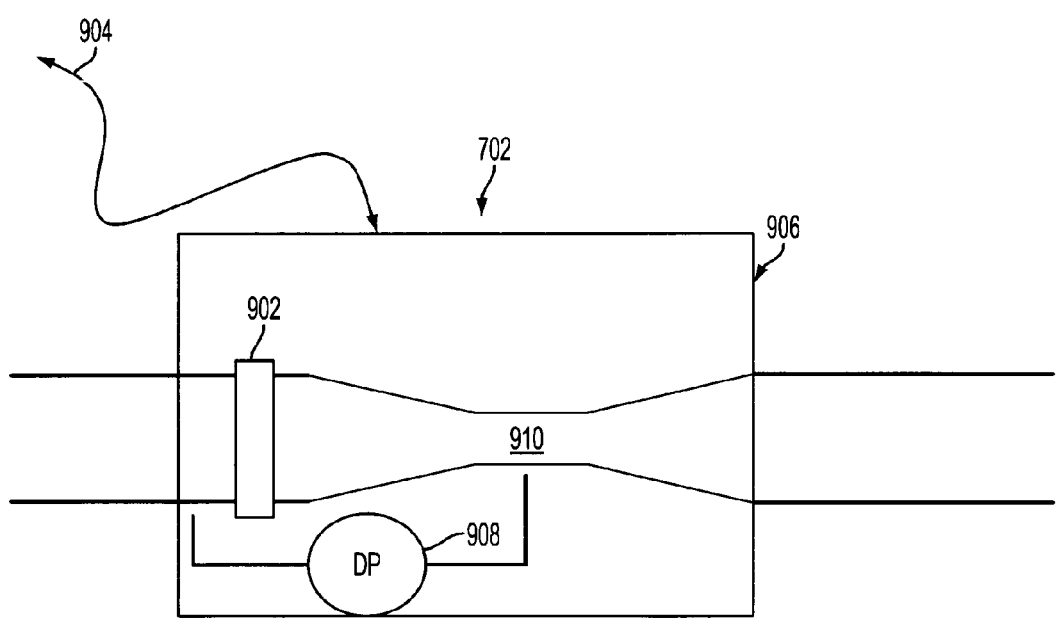
FIG. 11 is used to illustrate exemplary systems and methods for measuring fluid properties of four phase fluid flow with venturi measurement and nuclear measurement not at a venturi throat in accordance with exemplary embodiments disclosed herein.

FIG. 11 is used to illustrate exemplary systems and methods for measuring fluid properties of four phase fluid flow with venturi measurement and nuclear measurement not at a venturi throat in accordance with exemplary embodiments disclosed herein. The exemplary systems and methods of FIG. 11 operate in a similar manner as those of FIG. 9, except that the four phase nuclear subsystem 902 is located before the throat of the venturi 910.

Figure 12:
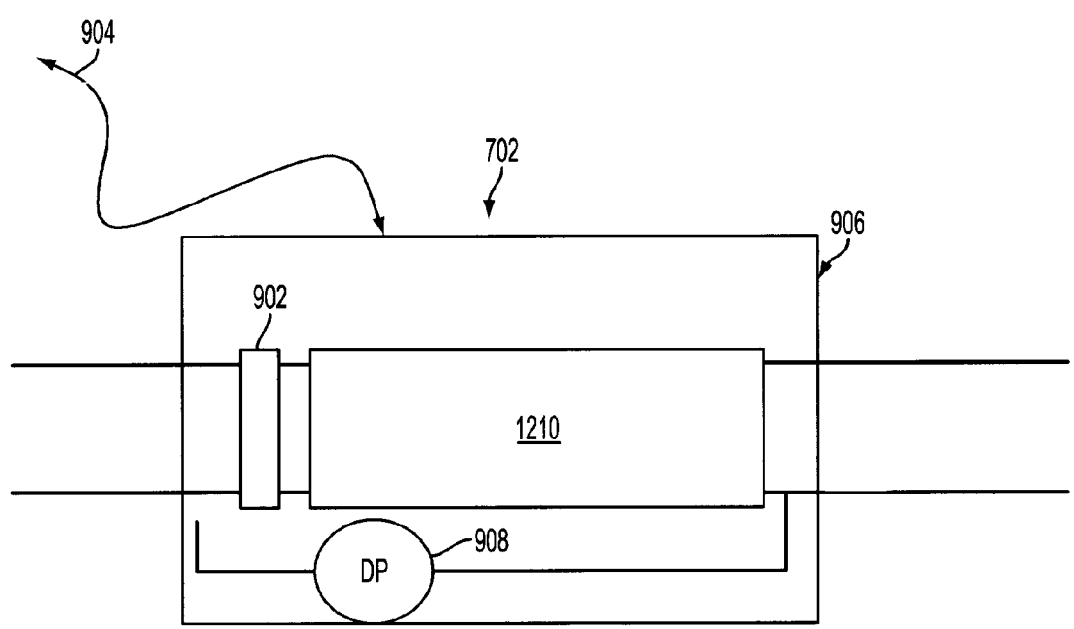
FIG. 12 is used to illustrate exemplary systems and methods for measuring fluid properties of four phase fluid flow with a generic solution employing differential pressure (DP) and nuclear measurement close but not interlaced in accordance with exemplary embodiments disclosed herein.

FIG. 12 is used to illustrate exemplary systems and methods for measuring fluid properties of four phase fluid flow with a generic solution employing differential pressure (DP) and nuclear measurement close but not interlaced in accordance with exemplary embodiments disclosed herein. The exemplary systems and methods of FIG. 12 operate in a similar manner as those of FIGS. 9-11, except that the four phase nuclear subsystem 902 is located before any suitable differential pressure device 1210 (e.g., a venturi, a choke, an elbow, an orifice, etc.) and with the differential pressure (DP) sensor 908 sensing the total differential pressure across the entire device 1210 and the four phase nuclear subsystem 902.

Figure 13:
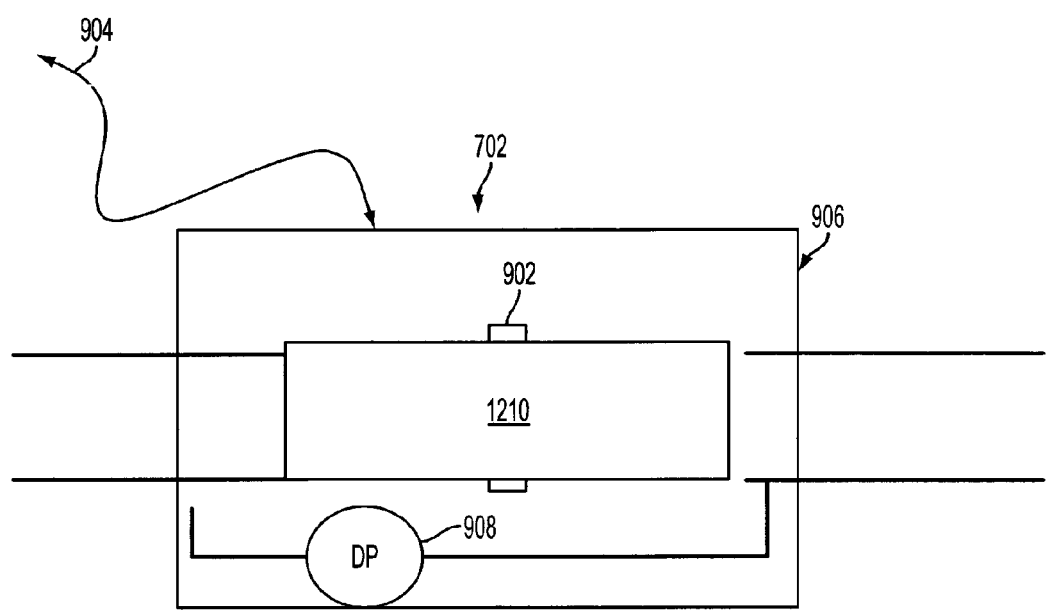
FIG. 13 is used to illustrate exemplary systems and methods for measuring fluid properties of four phase fluid flow with both differential pressure (DP) and nuclear measurement sensors combined in a same space in accordance with exemplary embodiments disclosed herein.

FIG. 13 is used to illustrate exemplary systems and methods for measuring fluid properties of four phase fluid flow with both differential pressure (DP) and nuclear measurement sensors combined in a same space in accordance with exemplary embodiments disclosed herein. The exemplary systems and methods of FIG. 13 operate in a similar manner as those of FIG. 12, except that the four phase nuclear subsystem 902 is located within any suitable differential pressure device 1210 (e.g., a venturi, a choke, an elbow, an orifice, etc.) and with the differential pressure (DP) sensor 908 sensing the total differential pressure across the entire device 1210.

Advantageously, the exemplary systems and methods described with respect to FIGS. 7-13 not only can make a determination of the diluent concentration, but also can determine, in real time properties of the main fluid behaviors, for example, such the viscosity of the oil-diluent mixture, and the like.

It should be noted that liquid viscosity is also very dependent on the line temperature and the water concentration, as minimum parameters. Therefore, the exemplary fluid behavior modeling 906 of the exemplary systems and methods can model several parameters that can be expressed in a format of a matrix or correlation and that are defined as an input to the multiphase flow meter 702. With respect to viscosity, for example, it generally needs to be defined at least versus diluent, water, and oil fraction, but also versus temperature. The viscosity behavior versus these parameters can be easily obtained from measurements in laboratory and then interpolated in the operational conditions through a full matrix of measurement. This can be also modeled, like for the case of viscosity, based on the knowledge of the viscosity behavior versus temperature, mixture of oil and diluent, mixture of water and oil, and the like.

Advantageously, the exemplary systems and methods described with respect to FIGS. 7-13 can employ a priori knowledge of the fluid behavior versus the several parameters by either the knowledge of the fluid and the interaction among them or through laboratory analysis, and the like, as applicable. For example, this can be modeled in any suitable manner and can be accessible through an embedded computer and then used in real-time to provide accurate information about the fluid behavior so as to obtain the highest level of accuracy.

The aspects of the exemplary systems and methods described with respect to FIGS. 7-13 with respect to viscosity measurements are advantageous, because over the years of development of the multiphase meters, the different development teams have been selecting the most robust and well tested measurement systems and methods accepted in the oil industry, and which are based on mass flow rate measurement. The exemplary systems and methods described with respect to FIGS. 7-13 can employ the differential pressure (DP) sensor 908 set around a section of a pipe, usually a restriction, such as a throat of the venturi 910 (e.g., this also can be located on an extension of a pipe) and the fact that this differential pressure can be linked with the total mass flow rate through equation of the type of Bernoulli (e.g., as developed for the venturi). Further exemplary embodiments, rather than being based on the venturi 910 design, can be based on other types of devices 1210, such a V-Cone, wedge or orifice plate, or any other suitable devices that generate a sufficient amount of pressure, and the like, and as will be appreciated by those of ordinary skill in the relevant art(s).

By extension, the differential pressure can be based on the total differential pressure measurement, as show in FIG. 10. As noted above, further exemplary embodiments can be applied to a bend or choke or a valve or any suitable subsystem 1210 with a pressure loss and having $4^{th}$ phase flowing through the meter. As shown in FIG. 7, the DP measurement is done at the throat of the venturi 910, but this measurement can be done at any suitable location, as will be appreciated by those of ordinary skill in the relevant art(s). Similarly, the nuclear measurement via the nuclear system 902 can be performed at the throat of the venturi 910, upstream or downstream of the differential pressure sensor device 908 or 1210, and the like, as shown in FIGS. 9-13, as will be appreciated by those of ordinary skill in the relevant art(s).

In any of the exemplary systems and methods employing the pressure loss to measure a mass flow rate, an equation can be written under a Bernoulli formulation, as presented in the below equation (12):

$$q_m = C_{vis} \cdot \sqrt{\frac{2}{1-\beta^4}} \cdot S \cdot Sf \cdot \sqrt{\Delta P \cdot \rho_m} \quad (12)$$

Figure 14:
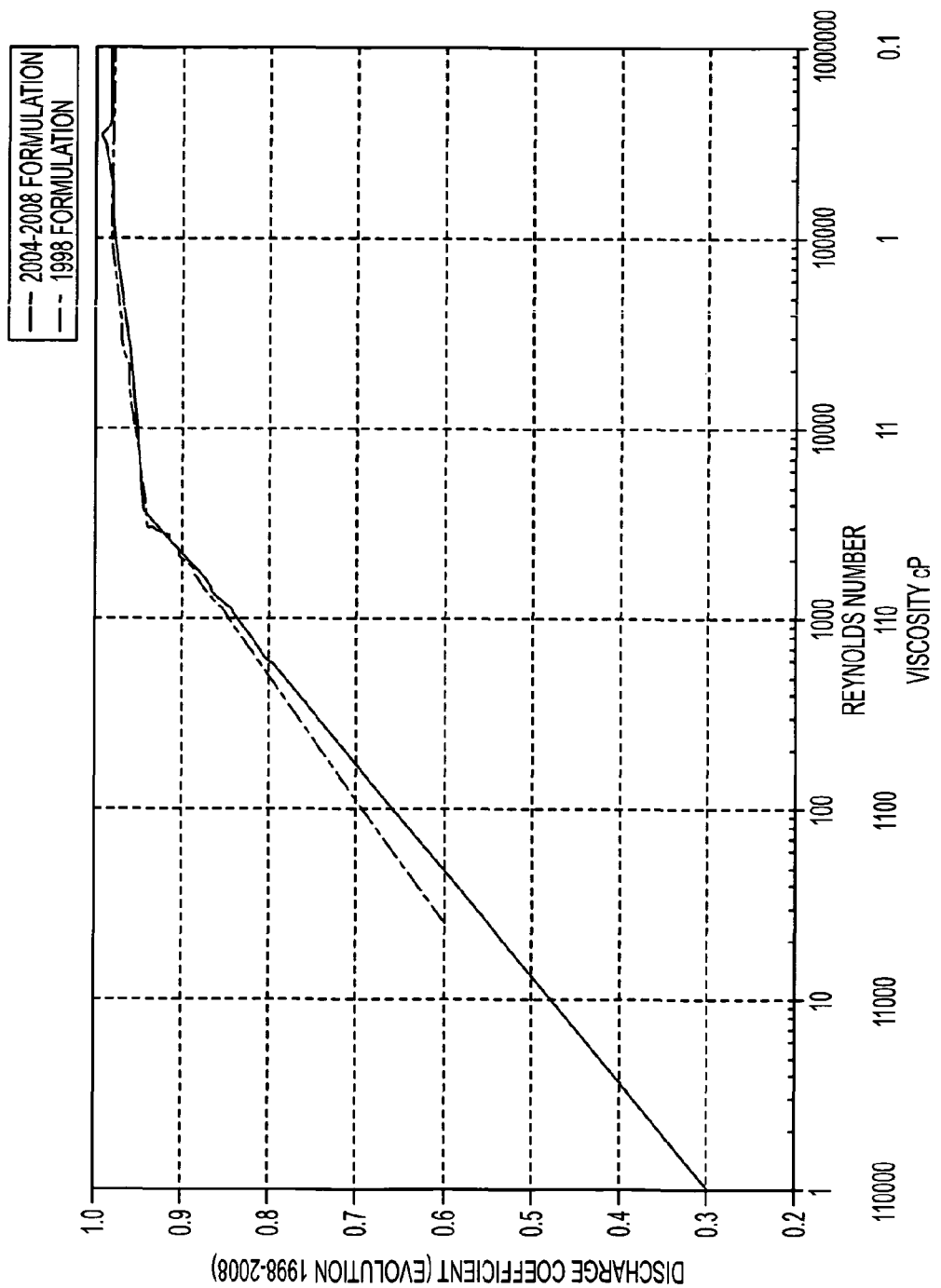
FIG. 14 is a graph illustrating indicative evolution of discharge coefficient values with a viscosity scale for a flow rate of 3000 bpd and with a mixture density of ~900 kg/m$^3$ and with GVF of ~50% for illustrating the exemplary systems and methods for measuring fluid properties of four phase fluid in accordance with exemplary embodiments disclosed herein.

The discharge coefficient, defined by "Cvis" and which can vary in heavy oil from a value lower than 0.1 up to 0.8, is shown in FIG. 14. Accordingly, FIG. 14 is a graph illustrating indicative evolution of discharge coefficient values with a viscosity scale for a flow rate of 3000 bpd and with a mixture density of ~900 kg/m³ and with GVF of ~50%. This discharge coefficient parameter is dependent of the mixture viscosity and can be approached to as the liquid viscosity. The exemplary systems and methods can be used to measure the concentration of the different four phases flowing through the meter 702 and the embedded fluid behavior model 906 can provide accurate viscosity of the mixture. It can be demonstrated that in a large range of viscosity, accuracy of 10-20% (e.g., relative error) is a minimum to achieve a large reduction regarding the impact of the viscosity parameter on the total flow rate measurement, as presented in equation (12). It has been determined over years of investigation that the discharge coefficient behavior can be modeled in a generic way versus the Reynolds number, even in a multiphase environment.

The Reynolds number and the viscosity being linked, and using an adequate definition of the Multiphase Reynolds number, it is possible to obtain a behavior of the discharge coefficient versus the Reynolds number in a multiphase flow, similar to the behavior in a monophasic flow. The type of curve presented FIG. 14 can be approached from a theoretical point of view by using the same parameters used to define the Reynolds number in monophasic flow and by extension in similar way to a multiphase flow, as shown below with equations (13)-(14):

$$Rey \approx \frac{\rho \cdot <U> \cdot d}{\mu} = \frac{4 \cdot \rho \cdot Q}{\mu \cdot \pi \cdot d} \approx \frac{4 \cdot \rho \cdot C_{vis}\sqrt{\Delta P/\rho}}{\mu \cdot \pi \cdot d} \sqrt{\frac{2}{1-\beta^4}} \pi \frac{d^2}{4} Sf \quad (13)$$

$$Rey \approx C_{vis} \cdot Sf \cdot \sqrt{\frac{2}{1-\beta^4}} \frac{d}{\mu} \sqrt{\Delta P \cdot \rho} \quad (14)$$

with Q: the volumetric flow rate,
<U>: is the average velocity at the throat of the Venturi,
μ: the viscosity of the liquid, d the throat diameter,
β: the square root of the ratio of the main pipe section and the throat section, and
Sf: being the shape factor (e.g., multiphase coefficient flow regime dependent).

It should be noted that the equation (13) is an implicit formulation and that iteration can be employed to produce the final multiphase Reynolds number.

The exemplary systems and methods employ use of the highest energy level to provide a high accuracy on the density of the mixture. This leads to the following advantages: better accuracy in the calculation of the total mass flow rate via equation (12), and the Reynolds number calculation improved significantly by the use of the same measured density measurement as presented in equation (14).

Any suitable type of function dependent on the Reynolds number can approach the model of the discharge coefficient mathematically. The exemplary systems and methods employ a generic formulation for different ranges of the Reynolds number (Re), as presented in the below equation (15):

$$C_{vis}(Re) = A \cdot \text{Log}(Re) + B \quad (15)$$

where A and B are experimentally derived constants with values between 0 and 1, depending on the Re range. This model is purely exemplary and used to illustrate the problem being solved, so that the present disclosure is not limited to only such a formulation.

With the viscosity being obtained from the fractional measurement of the four phases by the exemplary systems and methods, a first estimate of the Reynolds number can be used, assuming, for example, no friction and then with Cvis=1, which leads to a first estimate of flow rate. This value can be reused again in the definition of the Reynolds number. Then a new discharge coefficient is evaluated and then a new velocity. Such iterations can be performed by the exemplary systems and methods and are presented in the below equation (16) and can be stopped when the discharge coefficient reaches a stable value:

$$\begin{aligned} C_0 &= 1 => V_o \text{ \& with } v_0 => Re_0 => C_1 => V_1 \text{ \& with} \\ v_0 &=> Re_1 => C_2 \ldots => V_{n-1} \text{ \& with } v_0 => \\ Re_{n-1} &=> C_{n-1} => V_n \text{ \& with } v_0 => Re_n => C_n \end{aligned} \quad (16)$$

Then, the solution of equation (12) can be performed by the exemplary systems and methods, and finally using the different fraction measurements and fluid behaviors information, the flow rate measurement for each flow rate can be obtained by the exemplary systems and methods, as presented by the below equation (17):

$$\begin{aligned} &Q_{mass\_Total} \\ &Q_{vol\_total} = Q_{mass\_Total} / \rho_m \\ &GVF = fn\left(\frac{v_{liq}}{v_g}, \frac{\alpha_g}{\alpha_{liq}}, \frac{\rho_g}{\rho_{liq}}\right) \\ &Q_{vol\_Gas} = GVF \cdot Q_{vol\_total} \\ &Q_{vol\_liq} = (1 - GVF) \cdot Q_{vol\_total} \\ &Q_{vol\_wat} = \alpha_w \cdot Q_{vol\_liq} \\ &Q_{vol\_dil} = \alpha_d \cdot Q_{vol\_liq} \\ &Q_{vol\_oil} = \alpha_o \cdot Q_{vol\_liq} \end{aligned} \quad (17)$$

Figure 15:
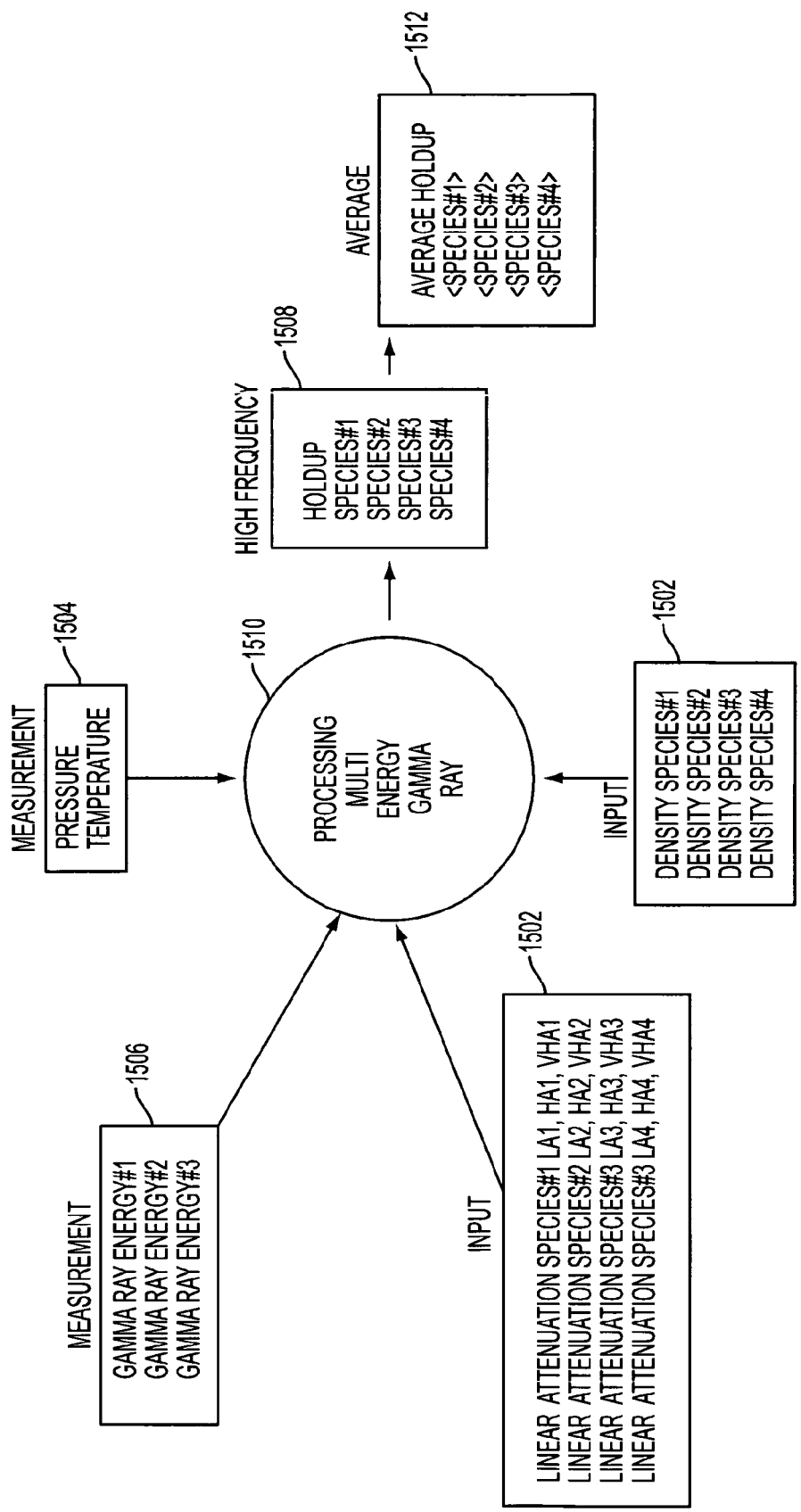
FIG. 15 is used to illustrate exemplary nuclear measurement systems and methods for measuring fluid properties of four phase fluid flow in accordance with exemplary embodiments disclosed herein.

FIG. 15 is used to illustrate exemplary nuclear measurement systems and methods for measuring fluid properties of four phase fluid flow in accordance with exemplary embodiments disclosed herein. The exemplary nuclear measurement systems and methods of FIG. 15 can be used with the four phase nuclear subsystem 902 of FIGS. 9-13. In FIG. 15, the exemplary nuclear measurement systems and methods include input parameters 1502, including some basic information about the density and properties of each independent fluid that are known either based on composition, experience, PVT simulation, measurements, and the like. The input parameters 1502 are compensated for pressure and temperature (e.g., measured in real-time) at 1504 and then in parallel measurement at 1506 of gamma ray attenuation at several energy levels is provided (e.g., measured in real-time) and at a high enough frequency at 1508, so as to determine the turbulence and chaotic behavior of the flow with data processing at 1510.

Based on the input measurements corrected for the relevant pressure and temperature, the measurements and an algorithmic process, as described in this disclosure, are used to provide, in real-time, the fractions of the four phases. This information is then used with the embedded fluid behavior model 906 to provide flow rate measurements and any suitable corrections, based on the four phase measurements. A suitable algorithm is also used to provide at 1512 an average of the initial output data at a high processing frequency.

In conclusion, the exemplary systems and methods solve the problem of the large presence of a $4^{th}$ phase in a multiphase flow, then correct for the impact of this phases in the fluid behavior, such as the viscosity, which is important in the case of use of diluent, and improve the density measurement of the mixture of $4^{th}$ phase. Finally, combined with a differential pressure meter, the exemplary systems and methods allow improvements in the calculation of the Reynolds number, the calculation of the discharge coefficient associated with friction, and the total mass flow rate calculation.

The present disclosure describes systems and methods for obtaining an accurate measurement of each fraction flowing in a multiphase flow, and independent of the flow structure and flow intermittence, so as to measure the four phases with a measurement device interacting with the fluid at a scale lower than a millimeter and so as to be totally generic. Indeed, the heavy oil or viscous fluid is usually constituted of foam or emulsion. Nuclear measurements and optical measurements have been considered as the best option to work in this condition and can be independent of the structure of the flow. The interaction is in the order of the nanometer or lower and can answer a metrological requirement.

The present disclosure also describes systems and methods based on nuclear energy gamma ray or X-ray measurements of the four phases at the same time, in a narrow space, in order to get the proper correlation of the different fractions due to chaotic and intermittent flow present in a multiphase flow, and at high frequency. This also represents the smallest and most compact technique of such measurement.

The present disclosure further describes systems and methods that can be most reliable and capable of being installed, for example, not in direct contact with the fluid and as such improve reliability by avoiding erosion, failure, and the like. Furthermore, this solution allows for the maintenance of the equipment without having to stop the flow.

The present disclosure describes systems and methods that demonstrate that based on the knowledge of nuclear properties it is possible to select appropriate energy gamma rays, which have different types of interactions with the fluid passing through the system. Such a nuclear device set with three levels of energy represents the best option to discriminate the four phases.

The present disclosure describes systems and methods, wherein the solution can utilize a radioactive system that can include a dedicated and specific source, such as Barium, which has some specific energy levels. Furthermore, this can be obtained by any combination of several chemical sources that provide some interactions based on the Compton Effect, the photoelectric effect, and then another energy level where both interactions are mixed, which leads to the solution problem of four phases and the inversion of a 4×4 matrix with four unknowns.

These three different ranges of energy can also be obtained with the use of an X-Ray tube with a suitable set of energies or a combination of X-rays generated electrically and a chemical source.

The present disclosure describes systems and methods, wherein a preferred method for solving the above-stated problems can be achieved at the highest level of accuracy by using the properties of the highest energy level that measures directly the mixture density (e.g., four phases together).

The present disclosure describes systems and methods, wherein the high accuracy obtained with the use of the highest level energy, as density measurement, can be optimal due to an optimum number of input parameters to the system, which can provide lower uncertainty for the entire measurement.

The present disclosure describes systems and methods, wherein the information obtained by the four-phase measurements can be combined with an embedded computer at the meter and can be used in combination with a dedicated fluid behavior model to provide the viscosity of a mixture. This fluid behavior model can be built from measurements in laboratory and by doing a study on the variation of the different parameters. In addition, this can be obtained by using a correlation available or by a mix of both systems. The purpose being to be able in real-time to correct or get access to the mixture viscosity.

The present disclosure describes systems and methods that use a differential pressure system, such as Venturi or similar devices that have been demonstrated to be robust in a multiphase environment. The present disclosure describes systems and methods, wherein the knowledge of the viscosity in real-time and the information about the density obtained by the highest level of energy of the chemical source allows obtaining the mass flow rate via the knowledge of the discharge coefficient.

The discharge coefficient can be obtained with higher accuracy with the use of the highest energy level measurement using the mixture density by a purely mathematical iteration on the definition of the mass flow rate and the Reynolds Number.

The present disclosure describes systems and methods, wherein the fourth phase measurement of the flow rate and the fraction thereof can be performed without a need for a separation device and based on the use of a differential pressure and a multi-energy gamma ray source, for example, including one element, such as Barium, and the like, or combination of different nucleotides (e.g., types of nuclear sources that can be used to get at least 3 energy levels or more), and the like. Pressure and temperature sensors can be added to be able to take into account variations of the fluid behavior.

The present disclosure describes systems and methods, wherein the combination of the mass flow rate and the information about the different fractional measurements provide in real-time at the well site the measurement of the water, oil, gas, and diluent phase with any of these different phases capable to be the most dominant one and without any suitable limitation. The exemplary systems and methods need not employ information about what is the continuous phase to discriminate one phase from another.

The present disclosure describes systems and methods that represent a most compact solution, with no moving parts and without any a need for a sensor in direct contact with the fluid, thus improving reliability, maintenance and robustness.

The present disclosure describes systems and methods that can be primarily applicable in a multiphase flow, wherein the presence of the $4^{th}$ phase is changing the fluid behavior of the entire mixture. This is illustrated with applications including the introduction of diluent inside a heavy oil well and with lower API; with injection of methanol inside a gas well; or with production of large amount of sand from a well, and the like.

Although the present disclosure is described in terms of application employing a diluent, the present disclosure can also be used with applications, including a blend of a first crude oil in a second crude oil, and the like, as will be appreciated by those of ordinary skill in the relevant art(s).

The present disclosure finds applications in flow assurance, including any suitable subsea and other applications, including applications in wet gas conditions, heavy oil conditions (e.g., including condensates, wet gas condensates, diluents, such as methanol, etc.), viscosity applications (e.g., fluid behavior correction, etc.), gas applications, and the like, as will be appreciated by those of ordinary skill in the relevant art(s).

Although the present disclosure has been described with reference to exemplary embodiments and implementations thereof, the present disclosure is not to be limited by or to such exemplary embodiments and/or implementations. Rather, the systems and methods of the present disclosure are susceptible to various modifications, variations and/or enhancements without departing from the spirit or scope of the present disclosure. Accordingly, the present disclosure expressly encompasses all such modifications, variations and enhancements within its scope.

What is claimed is:

1. A system for measuring fluid properties of a fluid flow having four phases, the system comprising:
    a fractional measurement device configured to determine respective fractional measurements of each of four phases of fluids flowing in a fluid flow; and
    a behavioral modeling device configured to determine, based on the respective fractional measurements of each of the four phases of fluids, respective flow rates for each of the four phases of fluids.

2. The system of claim 1, wherein the four phases of fluids comprise a water phase, a gas phase, an oil phase, and a diluent phase.

3. The system of claim 1, wherein the four phases of fluids impact an overall fluid behavior of the mix of the phases, and include a mix of a water phase, a gas phase, a crude phase, and a fourth phase, the fourth phase including a diluent phase or an oil phase having different properties than the crude phase.

4. The system of claim 1, wherein the fractional measurement device is based on a nuclear measurement device.

5. The system of claim 1, wherein the behavioral modeling device is based on a differential pressure measurement device, including at least one of a sensor, a venturi, an orifice, a valve, a choke, a bend, an elbow, and a restriction.

6. The system of claim 4, wherein the nuclear measurement device includes a barium source, wherein the barium source includes a combination of more than 9 main energy peaks regrouped in at least 4 main peaks, including a first peak around 30 keV, a second peak around 80 keV, a third peak around 160 keV, and a fourth peak around 302 to 383 keV.

7. A method for measuring fluid properties of a fluid flow having four phases, the method comprising:
    determining by a fractional measurement device respective fractional measurements of each of four phases of fluids flowing in a fluid flow; and
    determining by a behavioral modeling device, based on the respective fractional measurements of each of the four phases of fluids, respective flow rates for each of the four phases of fluids.

8. The method of claim 7, wherein the four phases of fluids comprise a water phase, a gas phase, an oil phase, and a diluent phase.

9. The method of claim 7, wherein the four phases of fluids impact an overall fluid behavior of the mix of the phases, and include a mix of a water phase, a gas phase, a crude phase, and a fourth phase, the fourth phase including a diluent phase or an oil phase having different properties than the crude phase.

10. The method of claim 7, wherein the fractional measurement device is based on a nuclear measurement device.

11. The method of claim 7, wherein the behavioral modeling device is based on a differential pressure measurement device, including at least one of a sensor, a venturi, an orifice, a valve, a choke, a bend, an elbow, and a restriction.

12. The method of claim 10, wherein the nuclear measurement device includes a barium source, wherein the barium source includes a combination of more than 9 main energy peaks regrouped in at least 4 main peaks, including a first peak around 30 keV, a second peak around 80 keV, a third peak around 160 keV, and a fourth peak around 302 to 383 keV.

13. An apparatus for measuring fluid properties of a fluid flow having four phases, the apparatus comprising:
    a fractional measurement device configured to determine respective fractional measurements of each of four phases of fluids flowing in a fluid flow; and
    a behavioral modeling device configured to determine, based on the respective fractional measurements of each of the four phases of fluids, respective flow rates for each of the four phases of fluids.

14. The apparatus of claim 13, wherein the four phases of fluids comprise a water phase, a gas phase, an oil phase, and a diluent phase.

15. The apparatus of claim 13, wherein the four phases of fluids impact an overall fluid behavior of the mix of the phases, and include a mix of a water phase, a gas phase, a crude phase, and a fourth phase, the fourth phase including a diluent phase or an oil phase having different properties than the crude phase.

16. The apparatus of claim 13, wherein the fractional measurement device is based on a nuclear measurement device.

17. The apparatus of claim 13, wherein the behavioral modeling device is based on a differential pressure measurement device, including at least one of a sensor, a venturi, an orifice, a valve, a choke, a bend, an elbow, and a restriction.

18. The apparatus of claim 16, wherein the nuclear measurement device includes a barium source, wherein the barium source includes a combination of more than 9 main energy peaks regrouped in at least 4 main peaks, including a first peak around 30 keV, a second peak around 80 keV, a third peak around 160 keV, and a fourth peak around 302 to 383 keV.

* * * * *